United States Patent
Gorman

(10) Patent No.: US 8,678,856 B2
(45) Date of Patent: *Mar. 25, 2014

(54) SAFETY ELECTRICAL OUTLET AND SWITCH SYSTEM

(71) Applicant: ProtectConnect, Inc., Tigard, OR (US)

(72) Inventor: Michael P. Gorman, Newport Beach, CA (US)

(73) Assignee: ProtectConnect, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,635

(22) Filed: Mar. 1, 2013

(65) Prior Publication Data
US 2013/0244478 A1 Sep. 19, 2013

Related U.S. Application Data

(60) Continuation of application No. 13/360,556, filed on Jan. 27, 2012, now Pat. No. 8,388,371, which is a continuation of application No. 12/115,419, filed on May 5, 2008, now Pat. No. 8,105,107, which is a continuation of application No. 11/354,264, filed on Feb. 14, 2006, now Pat. No. 7,367,121, which is a continuation of application No. 10/685,294, filed on Oct. 14, 2003, now abandoned, which is a continuation of application No. 10/023,393, filed on Dec. 17, 2001, now abandoned, which is a division of application No. 09/553,425, filed on Apr. 19, 2000, now Pat. No. 6,341,981.

(60) Provisional application No. 60/174,521, filed on Jan. 5, 2000.

(51) Int. Cl.
*H01R 13/60* (2006.01)

(52) U.S. Cl.
USPC .................................................. 439/535

(58) Field of Classification Search
USPC .................... 439/535; 174/60, 53; 220/3.8
See application file for complete search history.

(56) References Cited

U.S. PATENT DOCUMENTS 723,866 A 3/1903 Hart
776,855 A 12/1904 La Har
(Continued)

FOREIGN PATENT DOCUMENTS

| CN | 2381040 Y | 5/2000 |
| GB | 1 420 748 | 1/1976 |
| GB | 2 341 733 | 3/2000 |

OTHER PUBLICATIONS

U.S. Appl. No. 10/685,294, Oct. 14, 2003, Gorman.
(Continued)

*Primary Examiner* — Alexander Gilman
(74) *Attorney, Agent, or Firm* — Knobbe, Martens, Olson & Bear, LLP

(57) ABSTRACT

An electrical box is mounted on a wall stud, and a wiring panel is installed within the electrical box so as to partition the interior of the electrical box into a user inaccessible wiring compartment and a user accessible module compartment. A protective cover is attached to the wiring panel so as to protect the wiring panel during a makeup phase of wall panel installation and painting. After the makeup phase, the protective cover is removed from the wiring panel and a module having a user operable electrical function is mounted to the wiring panel within the user accessible module compartment.

14 Claims, 46 Drawing Sheets

(56) References Cited

U.S. PATENT DOCUMENTS

| | | |
|---|---|---|
| 949,123 A | 2/1910 | Klein |
| 1,171,914 A | 2/1916 | Wright |
| 1,328,224 A | 1/1920 | Benjamin |
| 1,758,126 A | 5/1930 | Peterson |
| 1,938,309 A | 12/1930 | Williams |
| 1,923,893 A | 8/1933 | Smith |
| 1,935,565 A | 11/1933 | Goetzelman |
| 1,956,196 A | 4/1934 | Korab |
| 2,140,376 A | 12/1938 | Anderson |
| 2,163,201 A | 6/1939 | Kalencik |
| 2,189,251 A | 2/1940 | Potter |
| 2,397,688 A | 4/1946 | Osinski |
| 2,433,917 A | 1/1948 | McCartney |
| 2,447,597 A | 8/1948 | Reed |
| 2,477,803 A | 8/1949 | Huber |
| 2,524,701 A | 10/1950 | Grill |
| 2,908,743 A | 10/1959 | Premoshis |
| 2,969,518 A | 1/1961 | Slater |
| 3,087,984 A | 4/1963 | Myer |
| 3,156,761 A | 11/1964 | Schinske |
| 3,189,077 A | 6/1965 | Willis, Jr. et al. |
| 3,214,726 A | 10/1965 | Cardenas et al. |
| 3,317,881 A | 5/1967 | Setecka |
| 3,467,941 A | 9/1969 | Martin |
| 3,489,985 A | 1/1970 | Martin |
| 3,510,822 A | 5/1970 | Patterson |
| 3,588,786 A | 6/1971 | Alfiero |
| 3,609,647 A | 9/1971 | Castellano |
| 3,654,663 A | 4/1972 | Algotsson |
| 3,710,287 A | 1/1973 | Eckert |
| 3,716,651 A | 2/1973 | Werner |
| 3,732,524 A | 5/1973 | Reed et al. |
| 3,868,161 A | 2/1975 | Frantz |
| 3,879,101 A | 4/1975 | McKissic |
| 3,930,704 A | 1/1976 | Dekanic |
| 3,972,498 A | 8/1976 | Paskert |
| 3,989,338 A | 11/1976 | Gosser |
| 4,103,125 A | 7/1978 | Marrero |
| 4,105,884 A | 8/1978 | Damsky |
| 4,117,258 A | 9/1978 | Shanker |
| 4,148,536 A | 4/1979 | Petropoulsos et al. |
| 4,165,443 A | 8/1979 | Figart et al. |
| 4,166,934 A | 9/1979 | Marrero |
| 4,179,175 A | 12/1979 | Farnworth et al. |
| 4,196,521 A | 4/1980 | Hutchinson et al. |
| 4,230,386 A | 10/1980 | Farnworth et al. |
| 4,263,472 A | 4/1981 | Maheu |
| 4,295,018 A | 10/1981 | Borrelli |
| 4,343,411 A | 8/1982 | Chesnut et al. |
| 4,372,634 A | 2/1983 | Ritchie et al. |
| 4,403,824 A | 9/1983 | Scott |
| 4,427,864 A | 1/1984 | Oster |
| 4,445,739 A | 5/1984 | Wooten |
| 4,485,282 A | 11/1984 | Lee |
| 4,493,517 A | 1/1985 | Hillary |
| 4,585,902 A | 4/1986 | Munroe |
| 4,599,485 A | 7/1986 | Smolik |
| 4,600,258 A | 7/1986 | Hu |
| 4,605,270 A | 8/1986 | Aslizadeh |
| 4,607,906 A | 8/1986 | Munroe |
| 4,612,412 A | 9/1986 | Johnston |
| 4,617,613 A | 10/1986 | Rice |
| 4,626,052 A | 12/1986 | Rumble |
| 4,627,675 A | 12/1986 | Taylor et al. |
| 4,634,015 A | 1/1987 | Taylor |
| 4,640,564 A | 2/1987 | Hill |
| 4,645,089 A | 2/1987 | Horsley |
| 4,664,457 A | 5/1987 | Suchy |
| 4,679,123 A | 7/1987 | Young |
| 4,722,693 A | 2/1988 | Rose |
| 4,747,506 A | 5/1988 | Stuchlik, III |
| 4,750,890 A | 6/1988 | Dube et al. |
| 4,780,088 A | 10/1988 | Means |
| 4,784,614 A | 11/1988 | Sadigh-Behzadi |
| 4,798,916 A | 1/1989 | Engel et al. |
| 4,808,127 A | 2/1989 | Swanic |
| 4,842,551 A | 6/1989 | Heimann |
| 4,871,893 A | 10/1989 | Slovak et al. |
| 4,873,469 A | 10/1989 | Young et al. |
| 4,880,950 A | 11/1989 | Carson et al. |
| 4,907,711 A | 3/1990 | Stuchlik, III |
| 4,914,265 A | 4/1990 | Mongeau |
| D308,045 S | 5/1990 | Counts et al. |
| 4,952,164 A | 8/1990 | Weber et al. |
| D310,814 S | 9/1990 | Rosenbaum |
| 4,967,990 A | 11/1990 | Rinderer |
| 4,972,045 A | 11/1990 | Primeau |
| 4,988,840 A | 1/1991 | Carson et al. |
| 4,998,343 A | 3/1991 | Costello |
| 5,002,501 A | 3/1991 | Tucker |
| 5,003,128 A | 3/1991 | Grondin |
| D316,250 S | 4/1991 | Mongeau |
| 5,004,432 A | 4/1991 | Tucker |
| 5,012,043 A | 4/1991 | Seymour |
| 5,030,119 A | 7/1991 | Lowe |
| 5,042,673 A | 8/1991 | McShane |
| 5,092,787 A | 3/1992 | Wise et al. |
| 5,098,046 A | 3/1992 | Webb |
| 5,178,555 A | 1/1993 | Kilpatrick et al. |
| 5,209,444 A | 5/1993 | Rinderer |
| 5,245,507 A | 9/1993 | Ericksen |
| D341,125 S | 11/1993 | Miller |
| 5,285,014 A | 2/1994 | Gilchrist |
| 5,288,041 A | 2/1994 | Webb |
| 5,289,934 A | 3/1994 | Smith et al. |
| 5,293,097 A | 3/1994 | Elwell |
| 5,297,973 A | 3/1994 | Gorman |
| 5,330,137 A | 7/1994 | Olivia |
| 5,342,993 A | 8/1994 | Siems |
| 5,386,959 A | 2/1995 | Laughlin et al. |
| 5,397,929 A | 3/1995 | Hogarth et al. |
| 5,399,806 A | 3/1995 | Olson |
| 5,415,564 A | 5/1995 | Winter et al. |
| 5,448,011 A | 9/1995 | Laughlin |
| 5,466,164 A | 11/1995 | Miyazaki et al. |
| 5,486,121 A | 1/1996 | Miller |
| 5,488,121 A | 1/1996 | O'Lenick, Jr. |
| 5,500,487 A | 3/1996 | Leon |
| 5,503,565 A | 4/1996 | McCoy |
| 5,516,068 A | 5/1996 | Rice |
| 5,525,755 A | 6/1996 | Christensen |
| 5,533,917 A | 7/1996 | Schmitz |
| 5,551,884 A | 9/1996 | Burkhart, Sr. |
| 5,562,222 A | 10/1996 | Jordan |
| 5,562,952 A | 10/1996 | Nakahigashi et al. |
| 5,599,199 A | 2/1997 | Wright |
| 5,608,196 A | 3/1997 | Hall et al. |
| 5,611,701 A | 3/1997 | Hahn |
| 5,613,874 A | 3/1997 | Orlando et al. |
| 5,625,531 A | 4/1997 | Padilla et al. |
| 5,639,991 A | 6/1997 | Schuette |
| D380,452 S | 7/1997 | Mix et al. |
| D384,643 S | 10/1997 | Nierlich et al. |
| 5,730,617 A | 3/1998 | Araki et al. |
| 5,741,153 A | 4/1998 | Schwer |
| 5,773,757 A | 6/1998 | Kenney et al. |
| 5,775,935 A | 7/1998 | Barna |
| 5,785,551 A | 7/1998 | Libby |
| 5,786,551 A | 7/1998 | Thangavelu |
| 5,807,139 A | 9/1998 | Volansky et al. |
| D399,495 S | 10/1998 | Bachschmid |
| 5,885,088 A | 3/1999 | Brennan et al. |
| 5,902,960 A | 5/1999 | Smith |
| 5,906,497 A | 5/1999 | Pham et al. |
| 5,924,888 A | 7/1999 | Larkin |
| 5,925,850 A | 7/1999 | Park |
| 5,931,325 A | 8/1999 | Filipov |
| D415,472 S | 10/1999 | Kelso et al. |
| 5,967,354 A | 10/1999 | Whitehead et al. |
| 5,980,279 A | 11/1999 | Muller |
| 5,998,747 A | 12/1999 | Kelso et al. |
| 6,029,581 A | 2/2000 | Daoud |
| 6,036,516 A | 3/2000 | Byrne |
| D430,114 S | 8/2000 | Bachschmid et al. |

(56) References Cited

U.S. PATENT DOCUMENTS

| | | |
|---|---|---|
| 6,098,939 A | 8/2000 | He |
| 6,201,187 B1 | 3/2001 | Burbine |
| 6,209,836 B1 | 4/2001 | Swanson |
| 6,231,358 B1 | 5/2001 | Kerr, Jr. et al. |
| 6,259,351 B1 | 7/2001 | Radosavljevic et al. |
| 6,309,248 B1 | 10/2001 | King |
| 6,311,229 B1 | 10/2001 | Burchard et al. |
| 6,341,981 B1 | 1/2002 | Gorman |
| 6,371,790 B1 | 4/2002 | Huang |
| 6,392,140 B1 | 5/2002 | Yee et al. |
| D461,775 S | 8/2002 | Littrell et al. |
| 6,441,304 B1 | 8/2002 | Currier et al. |
| 6,461,189 B1 | 10/2002 | Koh |
| 6,465,735 B2 | 10/2002 | May |
| 6,484,979 B1 | 11/2002 | Medlin, Jr. |
| 6,485,336 B1 | 11/2002 | Zebermann et al. |
| 6,492,591 B1 | 12/2002 | Metcalf |
| 6,494,728 B1 | 12/2002 | Gorman |
| 6,530,806 B2 | 3/2003 | Nelson |
| D472,883 S | 4/2003 | Harvey |
| 6,590,155 B2 | 7/2003 | Vrame et al. |
| 6,617,511 B2 | 9/2003 | Schultz |
| 6,623,296 B2 | 9/2003 | Okamoto |
| 6,642,450 B1 | 11/2003 | Hsiao |
| 6,648,678 B1 | 11/2003 | Kanekko |
| 6,653,566 B2 | 11/2003 | Petak et al. |
| 6,686,540 B2 | 2/2004 | Compagnone, Jr. |
| 6,700,062 B1 | 3/2004 | Allen, Jr. |
| 6,718,674 B2 | 4/2004 | Caveney et al. |
| 6,730,845 B1 | 5/2004 | Criniti et al. |
| 6,747,206 B1 | 6/2004 | Law |
| 6,765,146 B1 | 7/2004 | Gerardo |
| 6,767,245 B2 | 7/2004 | King |
| 6,770,814 B2 | 8/2004 | Shotey et al. |
| 6,774,307 B2 | 8/2004 | Kruse et al. |
| 6,803,521 B2 | 10/2004 | Vrame |
| 6,805,567 B2 | 10/2004 | Chapman et al. |
| 6,817,873 B1 | 11/2004 | Gorman |
| 6,820,760 B2 | 11/2004 | Wagner et al. |
| 6,830,477 B2 | 12/2004 | Vander Vorste et al. |
| 6,840,785 B2 | 1/2005 | Drane |
| 6,843,680 B2 | 1/2005 | Gorman |
| 6,850,159 B1 | 2/2005 | Mudge |
| 6,863,561 B2 | 3/2005 | Gorman |
| 6,867,370 B2 | 3/2005 | Compagnone, Jr. |
| 6,870,099 B1 | 3/2005 | Schultz et al. |
| 6,875,922 B1 | 4/2005 | Petak et al. |
| 6,884,111 B2 | 4/2005 | Gorman |
| 6,894,221 B2 | 5/2005 | Gorman |
| 6,906,260 B2 | 6/2005 | Grendahl |
| 6,908,334 B2 | 6/2005 | Huang |
| 6,923,663 B2 | 8/2005 | Oddsen et al. |
| 6,925,850 B2 | 8/2005 | Comer et al. |
| 6,956,169 B1 | 10/2005 | Shotey et al. |
| 6,967,284 B1 | 11/2005 | Gretz |
| 6,979,212 B1 | 12/2005 | Gorman |
| 6,986,674 B1 | 1/2006 | Gorman |
| 6,986,676 B1 | 1/2006 | Tronolone et al. |
| 7,052,313 B2 | 5/2006 | Gorman |
| 7,060,897 B2 | 6/2006 | Gorman |
| 7,071,414 B2 | 7/2006 | Kim |
| 7,081,009 B2 | 7/2006 | Gorman |
| 7,081,010 B2 | 7/2006 | Gorman |
| 7,083,466 B1 | 8/2006 | Hwang |
| 7,104,836 B1 | 9/2006 | Gorman |
| 7,265,291 B1 | 9/2007 | Gorman |
| 7,273,392 B2 | 9/2007 | Fields |
| 7,312,396 B1 | 12/2007 | Gorman |
| 7,321,120 B1 | 1/2008 | Gorman et al. |
| 7,323,638 B1 | 1/2008 | Radosavljevic |
| 7,332,683 B2 | 2/2008 | Gorman |
| 7,357,652 B1 | 4/2008 | Arenas et al. |
| 7,361,051 B2 | 4/2008 | Gorman |
| 7,367,121 B1 | 5/2008 | Gorman |
| 7,390,965 B2 | 6/2008 | Hartwig |
| 7,410,072 B2 | 8/2008 | Wegner et al. |
| 7,442,874 B2 | 10/2008 | Compagnone, Jr. |
| 7,468,486 B2 | 12/2008 | Yan |
| 7,495,170 B2 | 2/2009 | Dinh et al. |
| 7,544,941 B2 | 6/2009 | Gorman et al. |
| 7,572,977 B2 | 8/2009 | Gorman |
| 7,718,893 B2 | 5/2010 | Purves et al. |
| 7,762,838 B2 | 7/2010 | Gorman |
| 8,028,408 B2 | 10/2011 | Gorman |
| 8,105,107 B2 | 1/2012 | Gorman |
| 8,388,371 B2 * | 3/2013 | Gorman .................. 439/535 |
| 2002/0055301 A1 | 5/2002 | Gorman |
| 2002/0185296 A1 | 12/2002 | Schultz et al. |
| 2003/0178218 A1 | 9/2003 | Shotey et al. |
| 2003/0189043 A1 | 10/2003 | Wegner et al. |
| 2003/0205654 A1 | 11/2003 | Petak et al. |
| 2003/0213801 A1 | 11/2003 | Bradley et al. |
| 2004/0048507 A1 | 3/2004 | Hage |
| 2004/0129444 A1 | 7/2004 | Adams et al. |
| 2005/0001123 A1 | 1/2005 | Cheatham et al. |
| 2005/0067180 A1 | 3/2005 | Dinh |
| 2005/0067546 A1 | 3/2005 | Dinh |
| 2005/0176278 A1 | 8/2005 | Cheatham et al. |
| 2005/0224249 A2 | 10/2005 | Wegner et al. |
| 2005/0250378 A1 | 11/2005 | Gorman |
| 2006/0021780 A1 | 2/2006 | Hill |
| 2006/0065510 A1 | 3/2006 | Kiko et al. |
| 2007/0072486 A1 | 3/2007 | Gorman |
| 2007/0072487 A1 | 3/2007 | Gorman |
| 2008/0053698 A1 | 3/2008 | Purves et al. |
| 2010/0218969 A1 | 9/2010 | Purves et al. |
| 2012/0021623 A1 | 1/2012 | Gorman |

OTHER PUBLICATIONS

U.S. Appl. No. 10/923,393, Dec. 17, 2001, Gorman.
U.S. Appl. No. 10/988,742, Nov. 15, 2004, Gorman.
U.S. Appl. No. 11/287,883, Nov. 26, 2005, Gorman.
U.S. Appl. No. 11/287,885, Nov. 26, 2005, Gorman.
U.S. Appl. No. 11/452,130, Jun. 12, 2006, Gorman.
U.S. Appl. No. 11/519,447, Sep. 12, 2006, Gorman.
U.S. Appl. No. 12/106,984, Apr. 21, 2008, Gorman.
U.S. Appl. No. 12/115,419, May 5, 2008, Gorman.
U.S. Appl. No. 60/174,521, Jan. 5, 2000, Gorman.
U.S. Appl. No. 60/176,123, Jan. 14, 2000, Gorman.
U.S. Appl. No. 90/011,258, Jan. 12, 2011, Gorman.
U.S. Appl. No. 90/011,275, Oct. 8, 2010, Gorman.
Cooper Industries, Inc.; Crouse-Hinds Division, Power-Lock Locking Device—Product Specification, 1996, pp. B6. B55, Syracuse, NY.
Leviton Manufacturing Co, Inc., Levition D-200 Wiring Device Catalog, Revision B (Published by Leviton, 1981).
Leviton Manufacturing Co., Inc. Leviton product catalog D-503 (Published by Leviton, 2001).

* cited by examiner

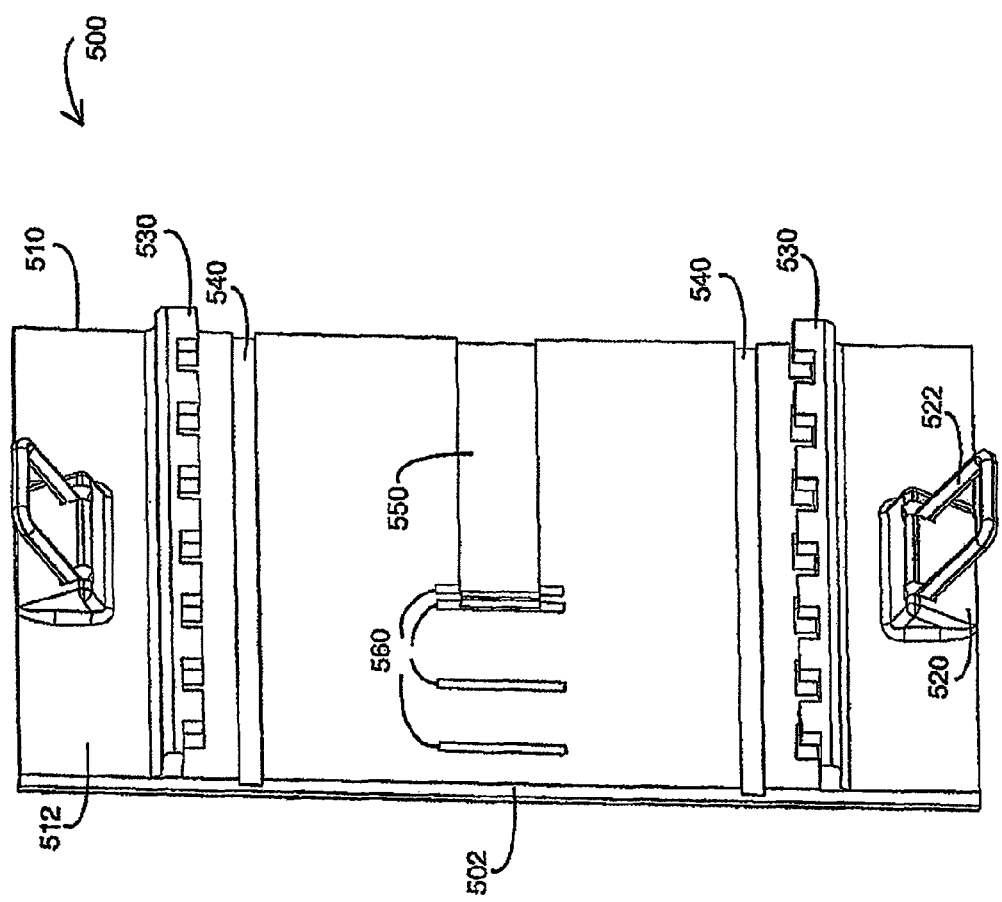

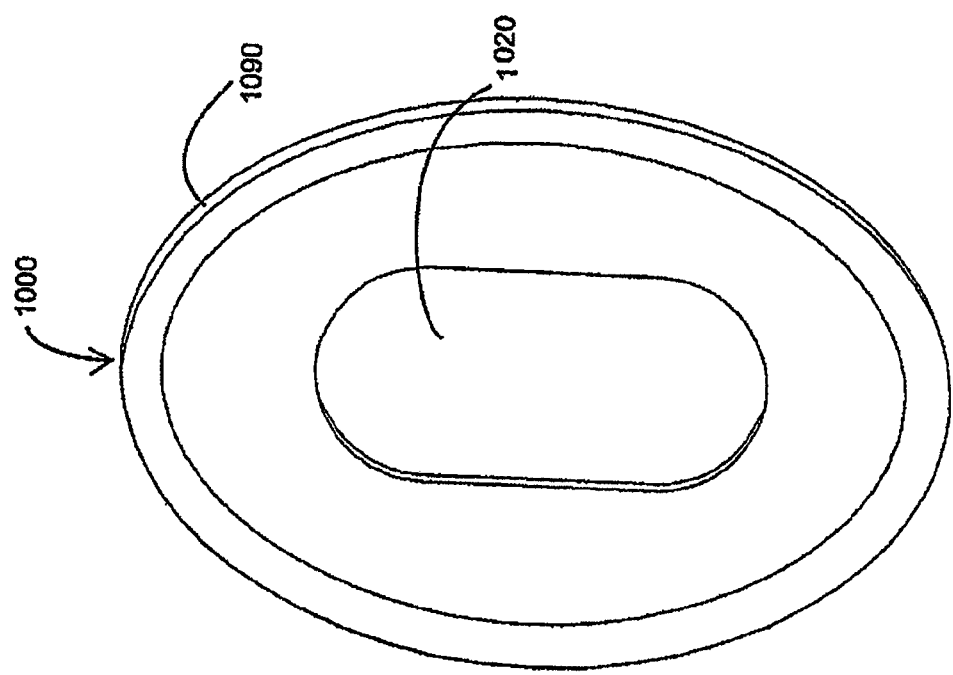

SAFETY ELECTRICAL OUTLET AND SWITCH SYSTEM

CROSS-REFERENCE TO RELATED APPLICATIONS

This application is a continuation of U.S. patent application Ser. No. 13/360,556, filed Jan. 27, 2012, which is a continuation of U.S. patent application Ser. No. 12/115,419, filed May 5, 2008, which is a continuation of U.S. patent application Ser. No. 11/354,264 filed Feb. 14, 2006, which is a continuation of U.S. patent application Ser. No. 10/685,294 filed Oct. 14, 2003, now abandoned, which is a continuation of U.S. patent application Ser. No. 10/023,393 filed Dec. 17, 2001, now abandoned, which is a divisional of U.S. patent application Ser. No. 09/553,425 filed Apr. 19, 2000, now U.S. Pat. No. 6,341,981, which relates to and claims the benefit of U.S. Provisional Patent Application No. 60/174,521 entitled "SAFETY ELECTRICAL WIRING ASSEMBLY," filed Jan. 5, 2000. All of the above-referenced patent applications and patents are hereby incorporated by reference herein in their entirety.

BACKGROUND OF THE INVENTION

Installation of a standard AC electrical system in a new residence or commercial site occurs in three phases, corresponding to the building construction. The rough phase corresponds to rough framing of the building, prior to attachment of wall panels to the frame. During this phase, blue boxes or similar electrical boxes are mounted to wall studs at predetermined locations, so that outlets are 18" and switches are 36" from the floor. Various box types are available, such as single-, double-, triple- or quadruple-wide configurations, among others. After the boxes are installed, a journeyman electrician, following a predetermined layout, routes Romex® brand or equivalent power cables through the framing to the appropriate boxes. A typical power cable has two solid core insulated conductors and a ground conductor, all surrounded by a non-metallic sheath. The power cable is fed through openings in the rear or sides of the electrical boxes. The journeyman typically labels the conductors by writing a code on the insulation that indicates the wiring connectivity and the type of module to be installed in each box. Then these cables are folded back into the boxes, unterminated, so as to be out of the way until the next phase. After all of the electrical wiring is routed in this manner, the electrical subcontractors leave the construction site, waiting for other subcontractors to finish their tasks.

The makeup phase corresponds to wall panel installation and painting. During this phase, the journeyman returns to the construction site to install modules into the electrical boxes. The journeyman retrieves the cable from each box, reviews the labeling, and connects the cable conductors to the appropriate module. One module choice is a duplex outlet that receives standard two-prong or three-prong grounded AC plugs. The outlet can be wired fall-hot, where each outlet is always connected to power, or half-hot, where one outlet is connected to power under control of a wall switch. Another module choice is a switch, which can be a standard on/off switch, a three-way switch or a dimmer switch, for example. After conductors are wired to a module, the module and attached conductors are pushed into the electrical box and the module is attached to the top and bottom of the box with screws. Once all modules are installed, the general contractor verifies the dwelling wiring against the electrical plans. If all of the wiring is correct, power can be connected to the dwelling for the first time.

The final phase corresponds to construction thing and finishing work. During the trim phase, face plates are mounted over the open-end of the electrical boxes, completing the standard electrical wiring process.

SUMMARY OF THE INVENTION

Problems with Standard Wiring Construction

There are multiple problems with standard electrical wiring construction. From the electrical contractor perspective, there are unnecessary costs associated with installation. Two separate trips are required for each job site, one for the rough phase and one for the makeup phase. Further, a journeyman electrician is required for each phase. During the makeup phase, installation of the wall panels can damage the work completed during the rough phase. One way in which damage occurs is router contact with exposed cables when drywallers create a hole to accommodate electrical box openings. Another form of damage occurs when drywall compound or paint fouls the exposed cables, insulation and labeling.

From the general contractor perspective, there are other problems with the standard electrical wiring construction. Verification of the electrical contractor's work is not possible until after the makeup phase. Until then, the electrical cables are unterminated. After the makeup phase, however, miswiring typically requires cutouts in the installed wall panels and associated patches after corrections are completed. Further, the electrical system cannot be activated until after verification. Thus, during the rough and makeup phases, electricity for tools and lighting must be supplied by generators, which create hazards due to fumes, fuel, and noise and are an unreliable electrical source. In addition, until the trim phase is completed, unskilled personnel have access to the electrical cable. Tampering can comprise the integrity of the electrical wiring and also create a safety problem after power is activated.

From a homeowner's perspective, there are problems with repair of the standard electrical wiring. FIG. 1 illustrates a prior art electrical wiring assembly 100, which includes a standard electrical box 110 and a standard duplex outlet 120. Replacement of a broken outlet 120 first requires removal of a face plate (not shown). The screws 130 that attach the outlet 120 to the top and bottom of the electrical box 110 must be removed next. The outlet 120 is then removed from the box 110 and the conductors 140 are removed by loosing the screws 150 on the outlet sides. The process is then reversed to attach the conductors 140 to a new outlet 120 and mount the new outlet 120 into the electrical box 110.

The prior art outlet replacement procedure described above exposes the homeowner to AC wiring upon removal of the face plate. This exposure creates a shock hazard. Further, a homeowner's reluctance to change out broken outlets or to spend the money to hire an electrician also creates a shock and a fire hazard from continued use of cracked, broken or excessively worn outlets. In addition, the integrity of the original wiring becomes questionable if a homeowner or other third party removes and replaces an outlet or switch. Miswiring by a third party can violate building codes and create shock and fire hazards, such as inadvertently switching the hot and neutral conductors, failing to attach ground wires, kinking or nicking conductors and improperly tightening connections.

Benefits of the Present Invention

The safety electrical outlet and switch system according to the present invention, benefits the electrical contractor in several respects. An aspect of the present invention is an electrical box, a wiring panel installed internally to the box and associated outlet and switch modules which snap into and out of the panel without exposure to or access to electrical system wiring attached behind the panel. The journeyman's work is completed at the rough phase, when installation of the wiring panel is complete. Thus, there is no need for the journeyman to return to the job site during the makeup phase because any semi-skilled laborer, following a punch-out code or other indicator on the panel, can snap-in an appropriate outlet or switch module. Further, there is no wiring access after the rough phase, protecting wiring integrity. Also, there are no exposed conductors or parts inside the electrical box that can be inadvertently damaged during wall panel installation. A protective cover is provided that prevents fouling by drywall compound or other materials during the makeup phase.

The safety electrical outlet and switch system according to the present invention also benefits the general contractor. Because wiring is completed during rough framing, verification and activation of the building electrical system can be performed at the rough phase. Miswiring can be corrected before wall panels are installed and painted, eliminating cut and patch repairs. Early electrical system activation eliminates the need to use generators. Lack of third party access to the journeyman's wiring preserves integrity after verification and eliminates shock exposure to other workers.

The present invention also benefits the homeowner. Replacement of broken sockets and switches can be easily and safely accomplished. Safety is enhanced by reducing exposure to electrical wiring and encouraging replacement of defective outlets and switches. Further, maintenance costs are reduced by reducing the need to hire an electrician for repairs. Wiring integrity is insured by reducing the opportunity of unqualified third parties to access the electrical system.

BRIEF DESCRIPTION OF THE DRAWINGS

FIG. 4A is a front perspective view of an installed snap-in outlet module;

FIG. 4B is a front perspective view of an unfastened snap-in outlet module with extended extractor handles;

FIG. 4C is a front perspective view of an uninstalled snap-in outlet module;

FIG. 4D is a front perspective view of an uninstalled snap-in switch module;

FIG. 4E is a front perspective view of an outlet module installed in a wiring panel;

FIG. 4F is a front perspective view of a switch module installed in a wiring panel;

FIGS. 5A-B are front and back perspective views, respectively, of a box mount;

FIGS. 7A-B are front and back perspective views, respectively, of an assembled wiring panel;

FIG. 7C is a back perspective view of a wiring panel board;

FIG. 7D is a front perspective view of a wiring panel back cover;

FIGS. 7E-F are back and front perspective views, respectively, of wiring panel internal conductors;

FIGS. 8A-B are front and back perspective views, respectively, of an assembled outlet module;

FIG. 8C is a front perspective view of a mounting bracket;

FIG. 8D is a back perspective view of an outlet module front cover;

FIG. 8E is a front perspective view of an outlet module back cover;

FIGS. 8F-G are back and front perspective views, respectively, of outlet module internal conductors;

FIGS. 9A-B are front and back perspective views, respectively, of an assembled switch module;

FIG. 9C is a back perspective view of a switch module front cover;

FIG. 9D is a front perspective view of a switch module back cover;

FIGS. 9E-F are back and front perspective views, respectively, of switch module internal conductors;

FIGS. 10A-D are perspective views of snap-on face plates;

FIGS. 10A-B are front and back perspective views of a flared rectangular face plate;

FIG. 10C is a front perspective view of a rectangular face plate;

FIG. 10D is a front perspective view of an oval face plate;

FIG. 13A is a electrical-box-side front perspective view of a mounted electrical box illustrating the releasable latch inside the box;

FIG. 13B-C are mounting-bracket-side front perspective views of a mounted electrical box, illustrating the box in first and second positions, respectively, relative to the box mount;

FIG. 14A is a perspective view of a mounted electrical box with an installed wiring panel, illustrating box mount alignment;

FIG. 14B is a perspective view of a mounted electrical box with an installed protective cover illustrating plug accessibility to electrical power during the rough framing phase of construction.

DETAILED DESCRIPTION OF THE PREFERRED EMBODIMENT

System Overview

Figure 2:
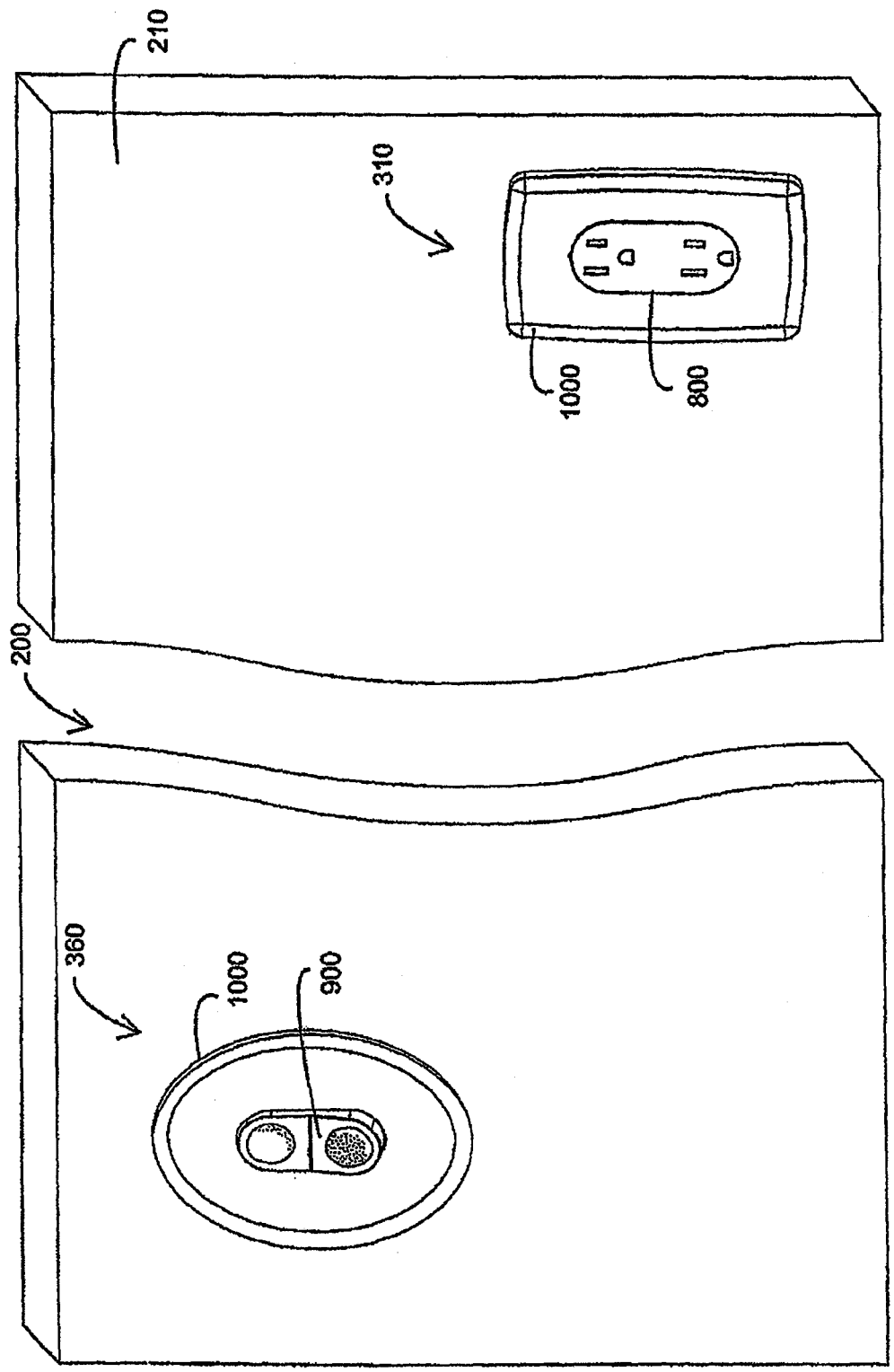
FIG. 2 is a perspective view of a safety electrical outlet and switch system according to the present invention.

FIG. 2 illustrates one embodiment of an installed safety electrical outlet and switch system 200 according to the present invention. As shown in FIG. 2, the outlet and switch system 200 comprises a outlet assembly 310 and a switch assembly 360. Each of these assemblies 310, 360 provide a user-accessible electrical function. The outlet assembly 310 is mounted in a wall 210 and functions to supply a user with electrical power through a conventional AC plug inserted into an outlet module 800. The switch assembly 360 is also mounted in the wall 210 and functions to allow a user to control electrical power to an outlet, a light or any of various electrical devices (not shown) by actuating a switch module 900. The installed outlet assembly 310 includes a face plate 1000 and an outlet module 800 mounted so that its visible portion is generally flush with the face plate 1000. The installed switch assembly 360 includes a face plate 1000 and a switch module 900 mounted so that its visible portion is in a plane generally parallel with the face plate 1000. The face plates 1000 are interchangeable between the outlet assembly 310 and switch assembly 360 and include a flared rectangular face plate, a rectangular face plate and an oval face plate, as described with respect to FIGS. 10A-D, below. Conveniently, the face plates 1000 attach to or are removed from the outlet assembly 310 or switch assembly 360 without the need for separate fastening devices, such as screws, and associated tools, as described with respect to FIG. 10B, below.

Figure 3A:
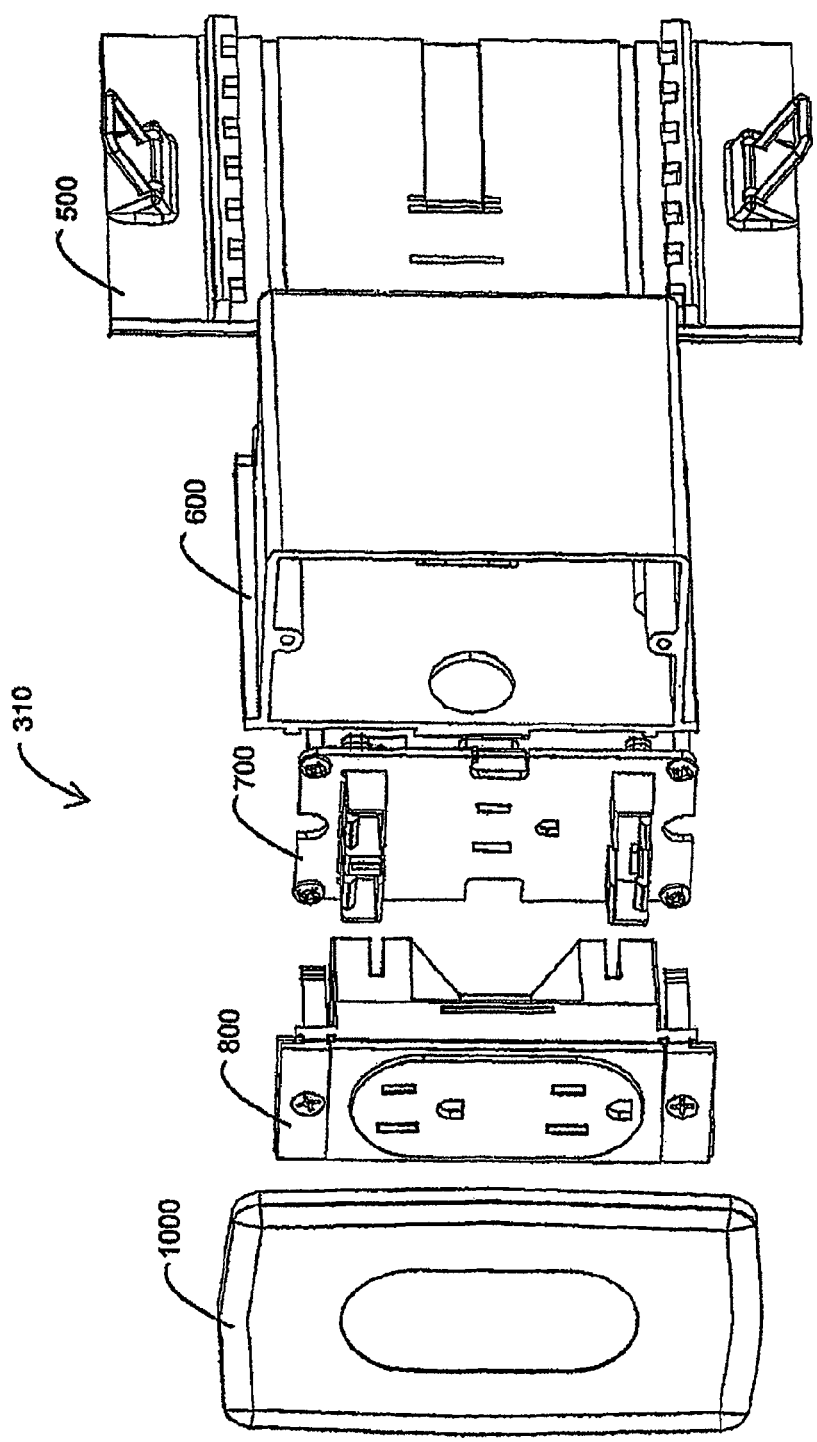
FIGS. 3A-B are exploded perspective views of an outlet assembly and a switch assembly, respectively, of the safety electrical outlet and switch system, illustrating box mount, electrical box, wiring panel, snap-in electrical modules and face plate portions.
Figure 3B:
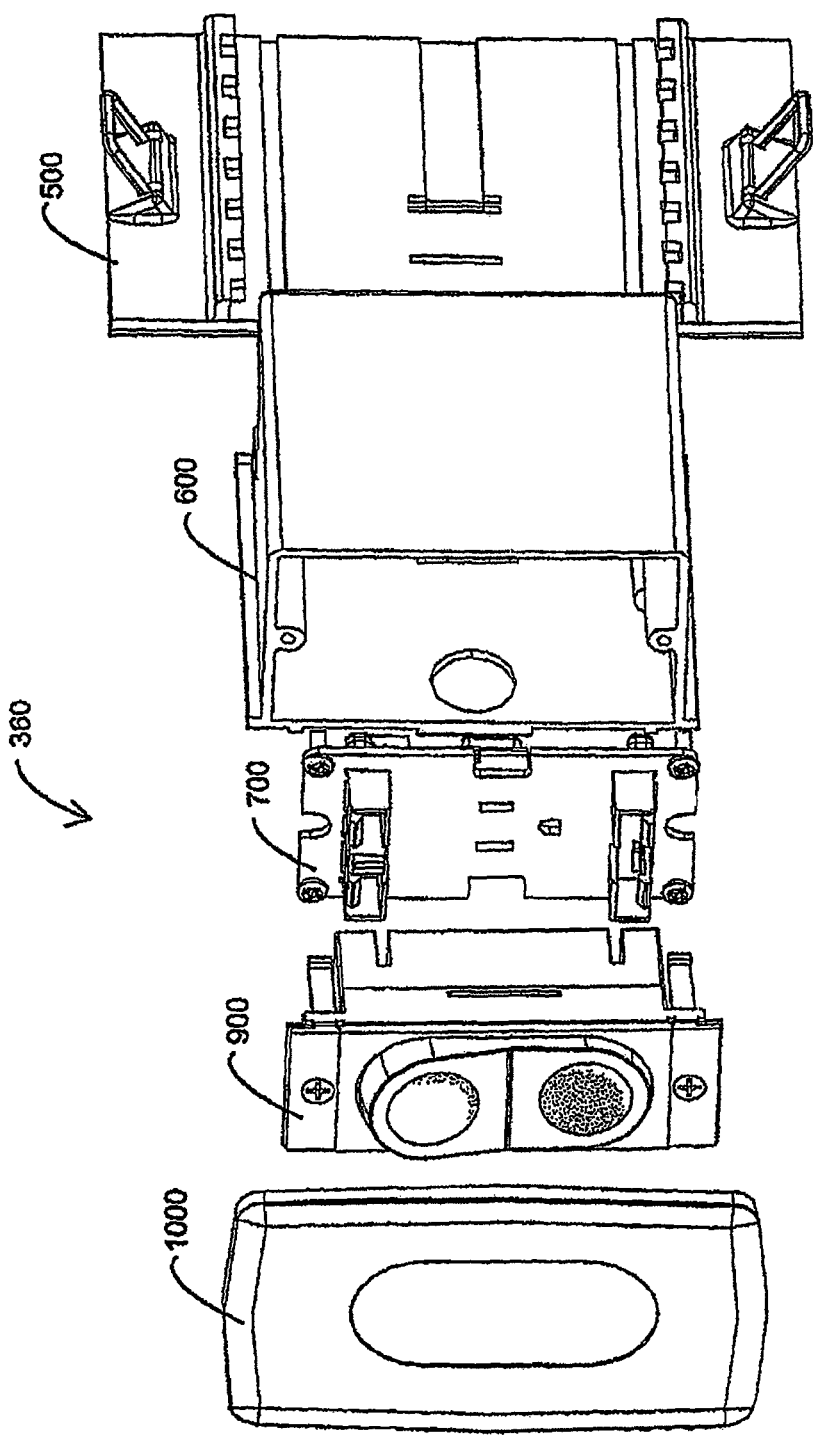

FIGS. 3A-B illustrate embodiments of a safety electrical outlet and switch system, comprising an outlet assembly 310 (FIG. 3A) and a switch assembly 360 (FIG. 3B). As shown in FIG. 3A, an outlet assembly 310 comprises a box mount 500, an electrical box 600, a wiring panel 700, an outlet module 800 and a face plate 1000. As shown in FIG. 3B, a switch assembly 360 comprises a box mount 500, an electrical box 600, a wiring panel 700, a switch module 900 and a face plate 1000. The box mount 500, electrical box 600, wiring panel 700, outlet module 800 (FIG. 3A), switch module 900 (FIG. 3B), and face plate 1000 are described in detail below with respect to FIGS. 5A-B, 6A-B, 7A-F, 8A-G, 9A-F and 10A-D, respectively. In one embodiment, the main structural components of the box mount 500, electrical box 600, wiring panel 700, outlet module 800, switch module 900, face plate 1000 and protective cover 1100 (FIG. 11) are composed of thermoplastics, such as nylon, polycarbonate or ABS. In that embodiment, the conductive components of the wiring panel 700, outlet module 800 and switch module 900 are brass or copper alloys. One of ordinary skill in the art will recognize that other materials can be used for the structural and conductive components of the present invention.

Figure 4A:
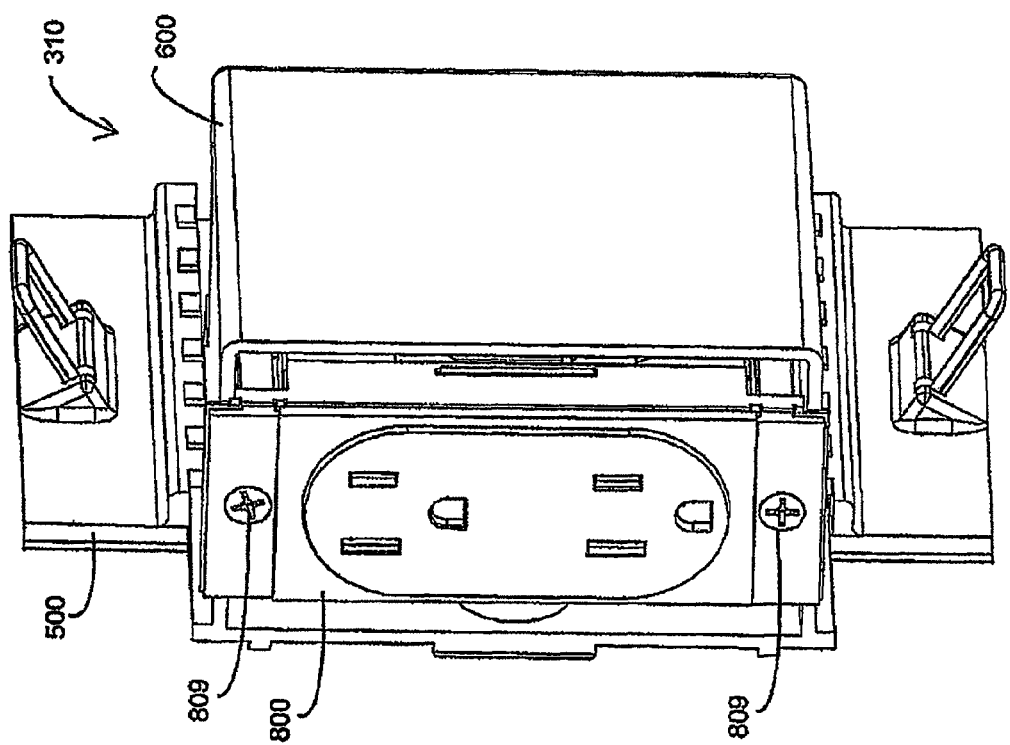
FIGS. 4A-F are perspective views illustrating the removal and installation of snap-in electrical modules.
Figure 4B:
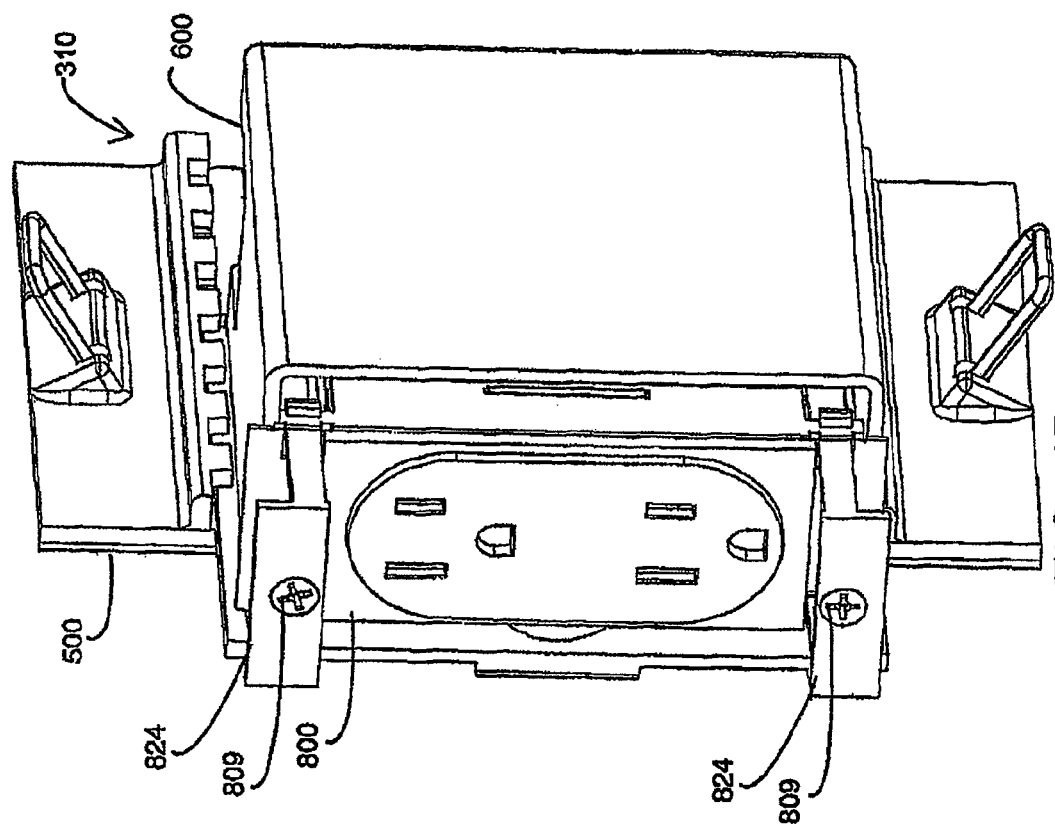
Figure 4C:
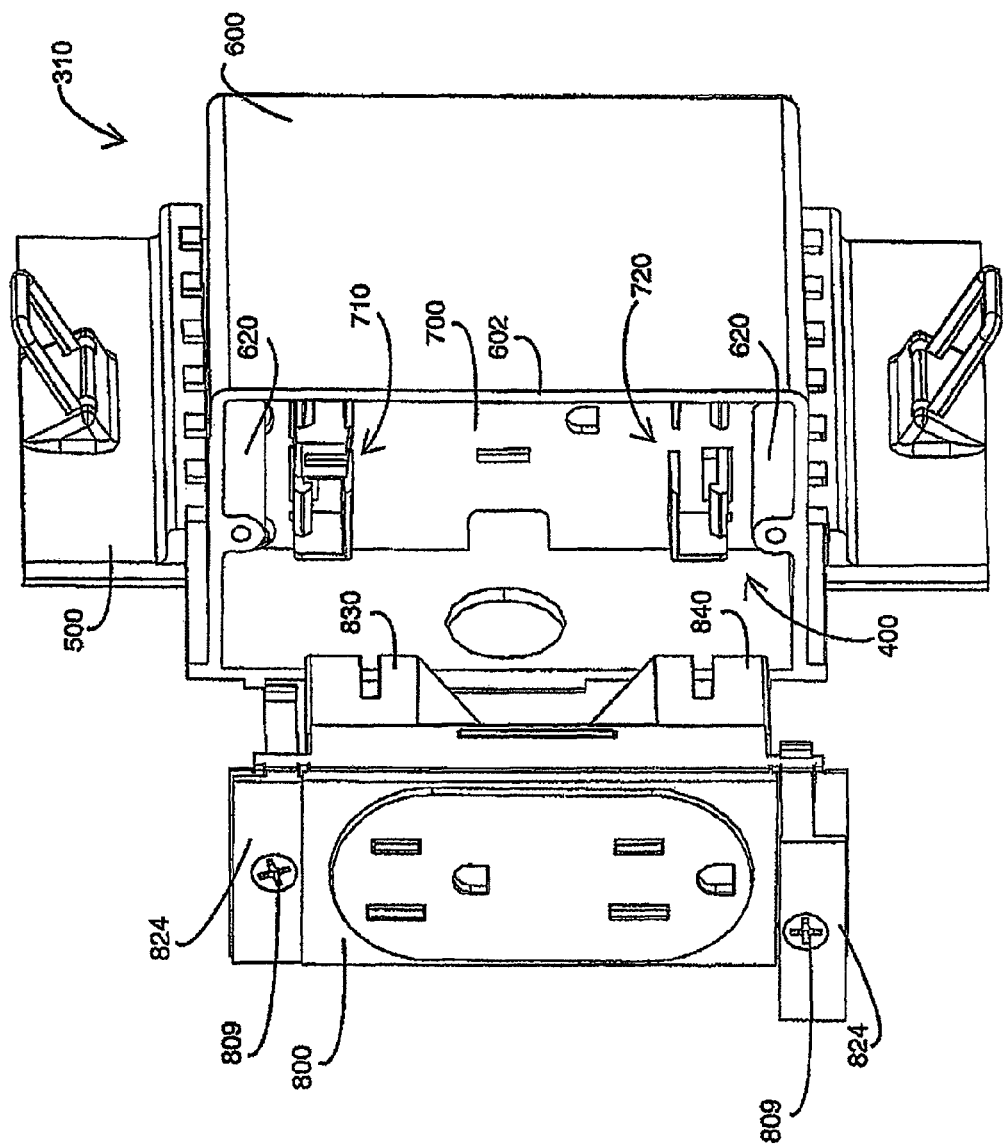
Figure 4D:
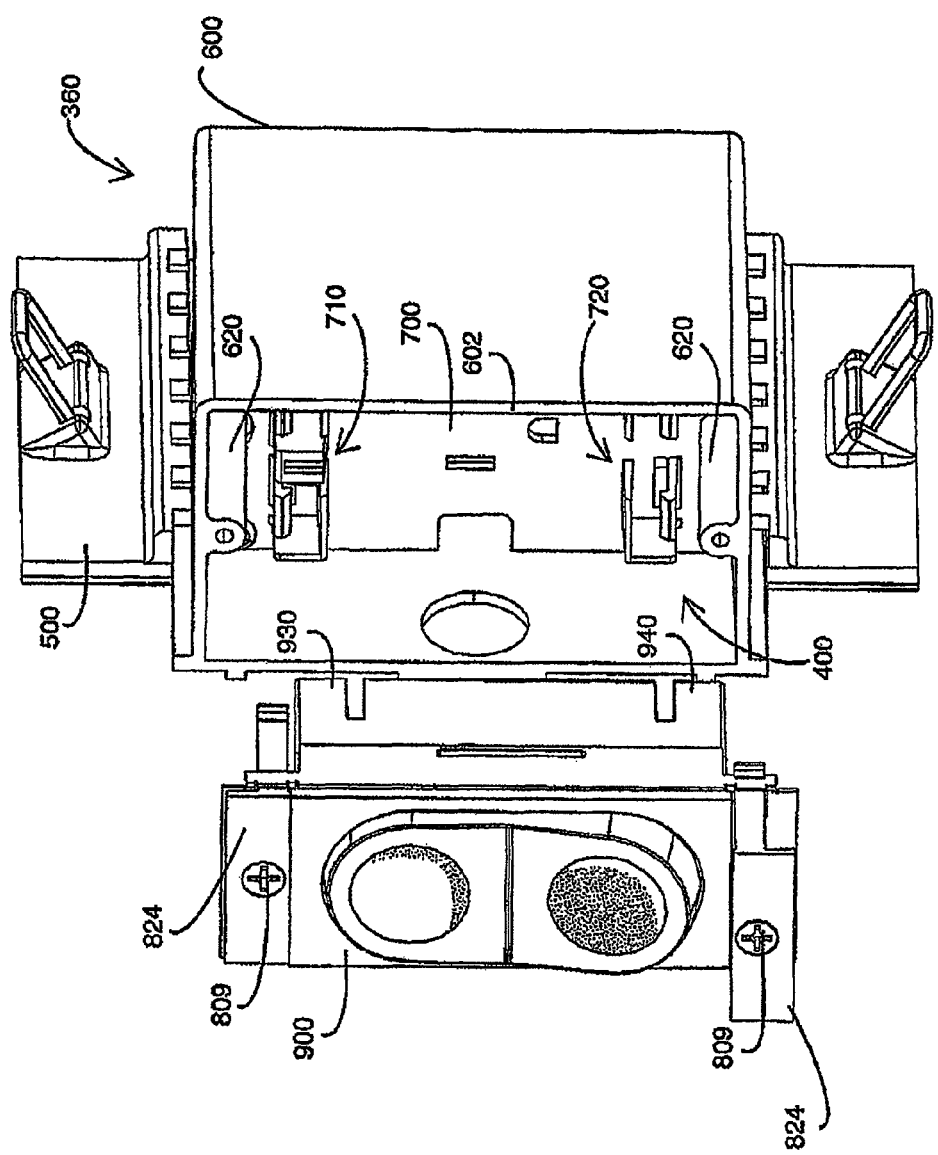

FIGS. 4A-F illustrate removal and installation of a snap-in outlet module 800 (FIG. 4C) or a snap-in switch module 900 (FIG. 4D). FIG. 4A shows an installed outlet assembly 310 with the face plate 1000 (FIG. 3A) removed. An outlet module 800 is removably attached to the wiring panel 700 (FIG. 4C) and secured with fasteners 809 to the electrical box 600.

FIG. 4B shows the outlet module 800 during removal from, or installation into, the electrical box 600. During removal, the fasteners 809 are unfastened to release the outlet module 800 from the electrical box 600 and extend the extractor handles 824, as shown. The extended extractor handles 824 are manually gripped and pulled to unsnap the outlet module 800 from the wiring panel 700 (FIG. 4C). The outlet module 800 is then removed from electrical box 600, as shown in FIG. 4C. During installation, the process is reversed. The extended extractor handles 824 are pushed into the outlet module 800, and the outlet module 800 is secured to the electrical box 600, as shown in FIG. 4A, using the fasteners 809 to attach to the module mounting posts 620 (FIG. 4C)

FIG. 4C shows an outlet module 800 during installation into or removal from the electrical box 600. For installation, the outlet module 800 is placed at the electrical box open front face 602, as shown. The outlet module 800 is then inserted into the module compartment 400 interior to the electrical box 600 between the front face 602 and the wiring panel 700. The top module fixture 830 and bottom module fixture 840 engage the top panel fixture 710 and bottom panel fixture 720, respectively. The outlet module 800 is then pressed against the wiring panel 700, which snaps the outlet module 800 into the wiring panel 700, electrically connecting the outlet module 800 and wiring panel 700. The outlet module 800 is then secured to the electrical box 600, as described above with respect to FIG. 4B.

FIG. 4D shows a switch module 900 during installation into or removal from the electrical box 600. For installation, the switch module 900 is placed at the electrical box front face 602, as shown. The switch module 900 is then inserted into the module compartment 400 interior to the electrical box 600. The top module fixture 930 and bottom module fixture 940 engage the top panel fixture 710 and bottom panel fixture 720, respectively. The switch module 900 is then pressed against the wiring panel 700, which snaps the switch module 900 into the wiring panel 700, electrically connecting the switch module 900 and wiring panel 700. The switch module 900 is then secured to the electrical box 600, in a manner similar to that described above with respect to FIG. 4B.

Figure 4E:
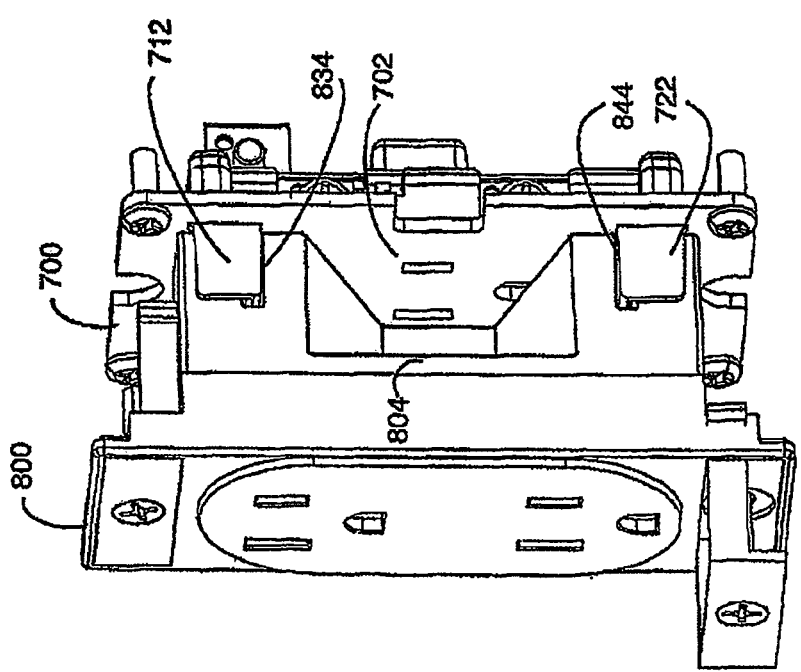

FIG. 4E shows the outlet module 800 installed into the wiring panel 700. The outlet module back cover 804 faces the wiring panel front side 702. The wiring panel top guides 712 fit within the outlet module top slots 834, and the wiring panel bottom guides 722 fit within the outlet module bottom slots 844.

Figure 4F:
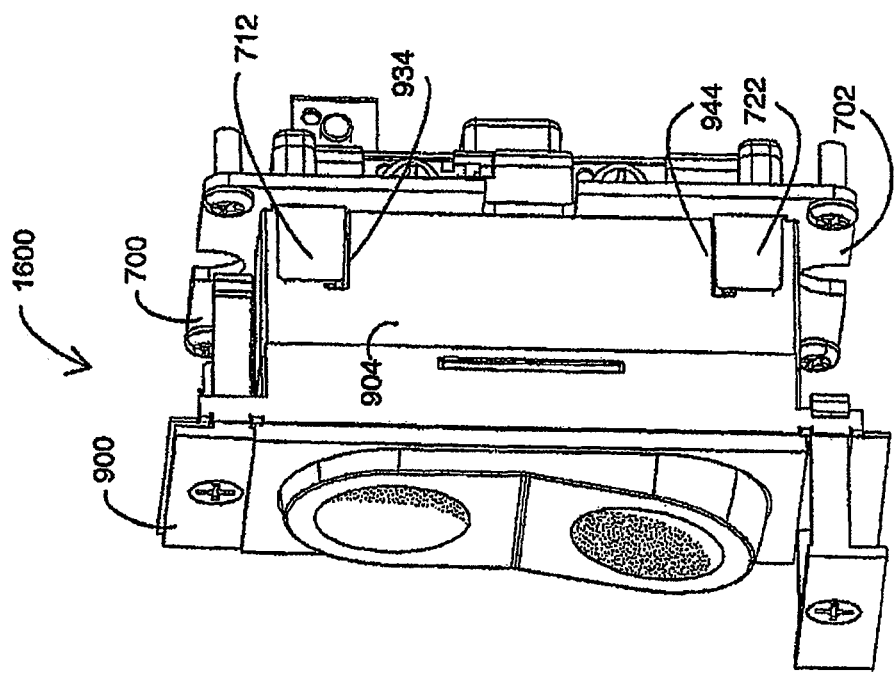

FIG. 4F shows the switch module 900 installed into the wiring panel 700. The switch module back cover 904 faces the wiring panel front side 702. The wiring panel top guides 712 fit within the switch module top slots 934, and the wiring panel bottom guides 722 fit within the switch module bottom slots 944.

Box Mount

Figure 5B:
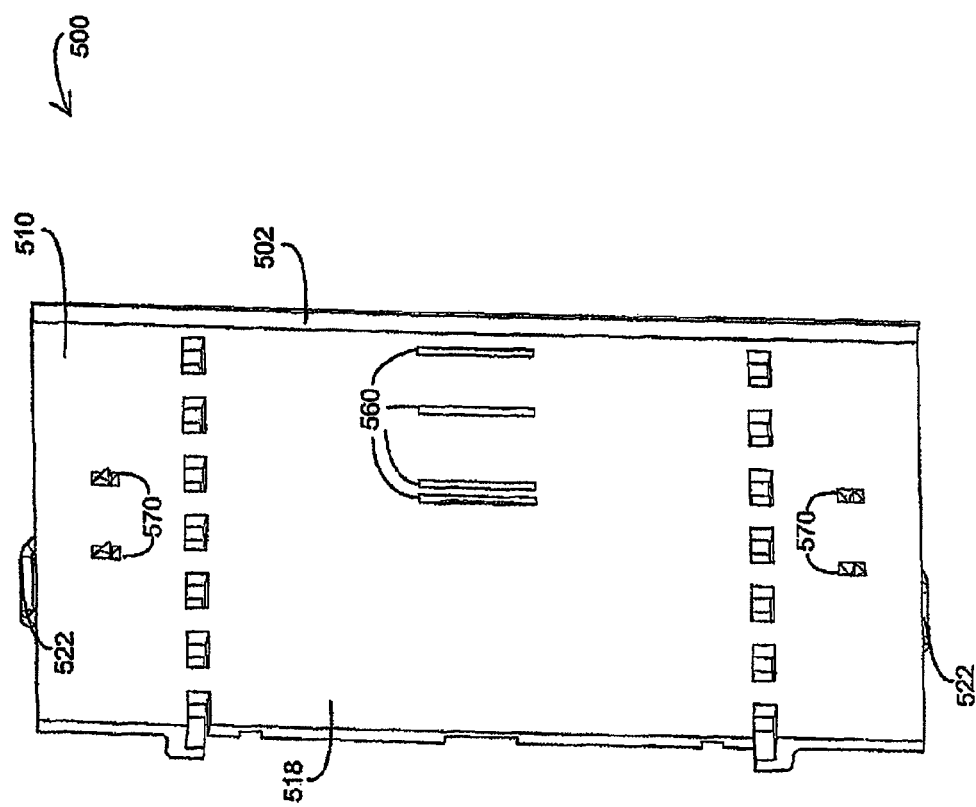
Figure 6A:
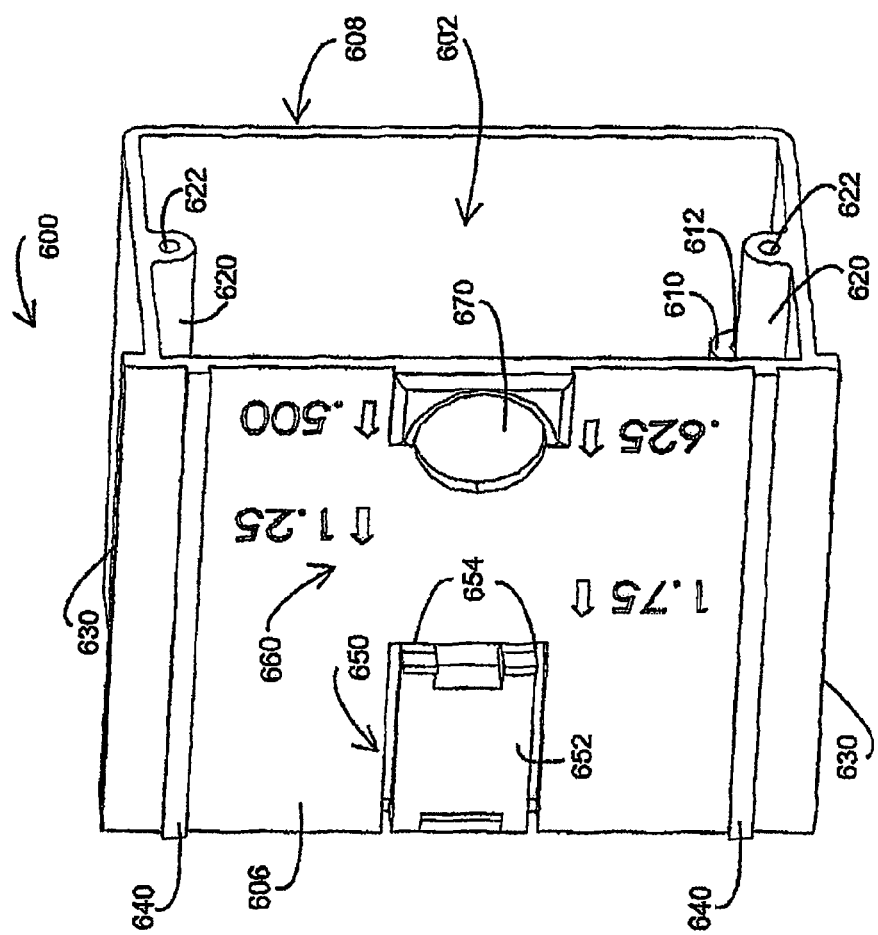
FIGS. 6A-B are front and back perspective views, respectively, of an electrical box.
Figure 6B:
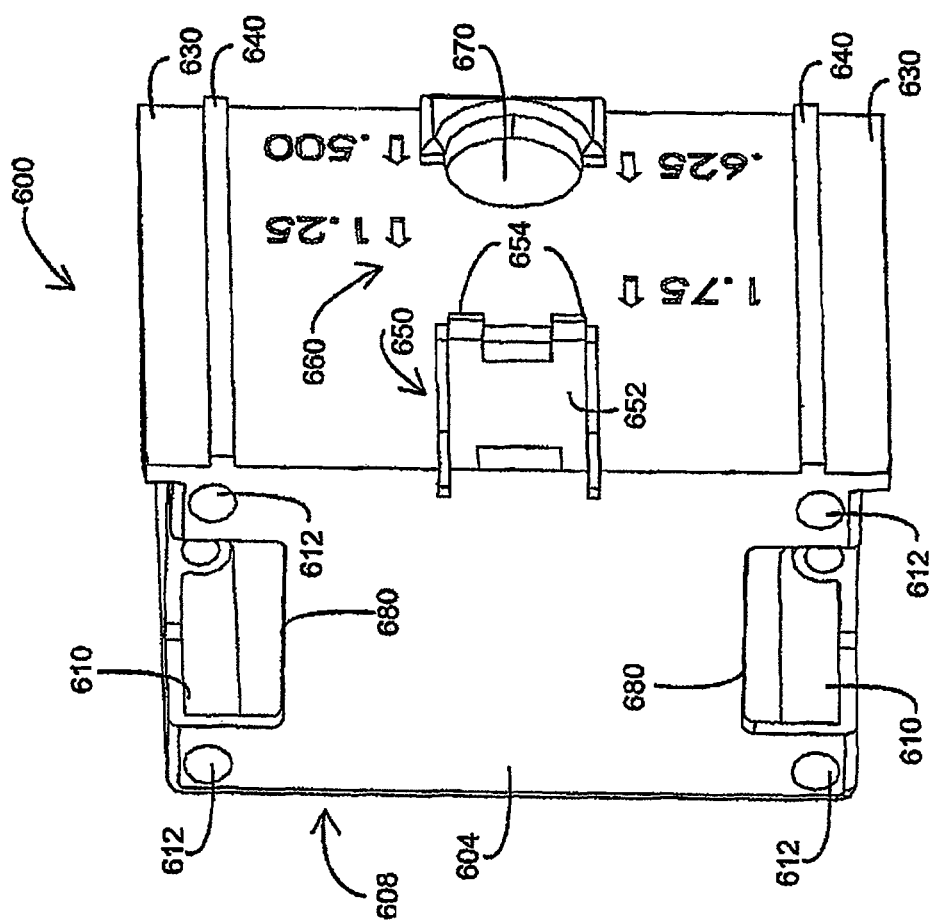

FIGS. 5A-B show a box mount 500, which attaches to a framing stud and provides a slidable attachment for the electrical box 600 (FIGS. 6A-B). As shown in FIG. 5A, the box mount 500 has a stud plate 510, fastener holders 520, mounting brackets 530, grooves 540, a latch channel 550 and catch slots 560. The stud plate 510 has a box side 512, a stud side 518 (FIG. 5B), and a leading edge 502 that functions as a stud alignment guide. The fastener holders 520 receive and retain fasteners 522, such as staples as shown. The box mount 500 is attached to a wall stud with the stud side 518 flush against the stud and with the leading edge 502 aligned with a stud edge. The fasteners 522 are hammered or otherwise driven into the stud through apertures 570 (FIG. 5B) on the stud side 518 (FIG. 5B). Attachment of the box mount to a wall stud is described in further detail with respect to FIG. 14A, below. The electrical box 600 (FIGS. 6A-B) is attached to the box mount 500 by placing the electrical box 600 (FIGS. 6A-B) adjacent the area between the mounting brackets 530, with the latch 650 (FIGS. 6A-B) adjacent the channel 550. The slides 630 (FIGS. 6A-B) are inserted into the mounting brackets 530 and the guides 640 (FIGS. 6A-B) into the grooves 540, as described in further detail with respect to FIG. 13A, below. The catch slots 560 removably retain the electrical box 600 (FIGS. 6A-B) at various fixed positions, as described in further detail with respect to FIGS. 13B-C, below.

Electrical Box

FIGS. 6A-B illustrate an electrical box 600. The electrical box 600 has outer dimensions generally consistent with conventional electrical boxes. The electrical box 600 has an open front face 602 and a back face 604. As shown in FIGS. 6A-B, the electrical box 600 has a mounting side 606 and an opposite gripping side 608. The mounting side 606 has slides 630, guides 640, a latch 650, position indicators 660, a finger grip 670 and apertures 680. The slides 630 and guides 640 mate with corresponding brackets 530 (FIG. 5A) and grooves 540 (FIG. 5A) on the box mount 500 (FIGS. 5A-B), as described with respect to FIG. 13A, below. The latch 650 has a spring portion 652 and a tab portion 654. The spring portion 652 is attached to the electrical box 600 along the back face 604 and extends along the mounting side 606, terminating with the tab portion 654. The tab portion 654 extends from the spring portion 652 generally perpendicularly to the mounting side 606, away from the electrical box 600. When the electrical box 600 is attached to the box mount 500 (FIGS. 5A-B), the catch 654 is configured to engage in any of the catch slots 560 (FIGS. 5A-B). The finger grip 670 is utilized to manually grip and position the electrical box 600 relative to the box mount 500 (FIGS. 5A-B) according to the position indicators 660, as described in further detail with respect to FIGS. 13B-C, below. The apertures 680 are located on the back face 604 for routing power cable through the back face 604 and into the interior of the electrical box 600. In another embodiment, a center aperture (not shown) is included, also for routing power cable into the interior of the electrical box 600.

Figure 8A:
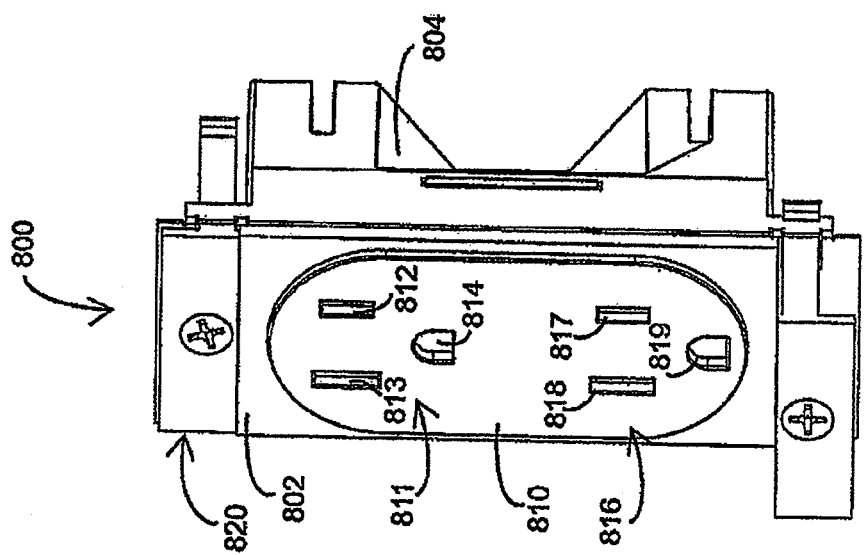
FIGS. 8A-F are perspective views of an outlet module.
Figure 8B:
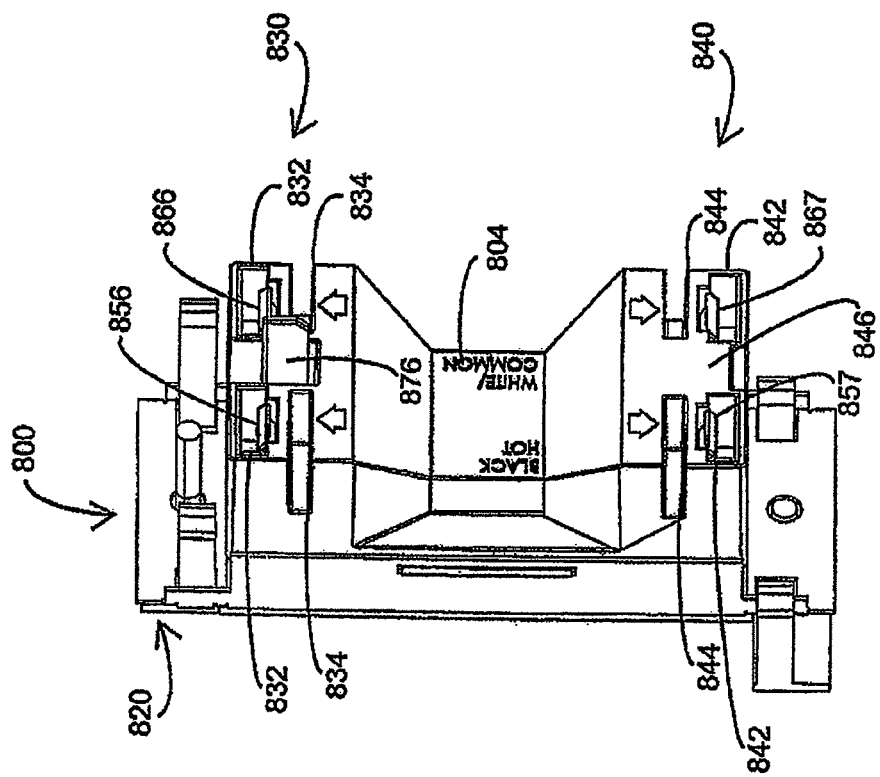
Figure 9A:
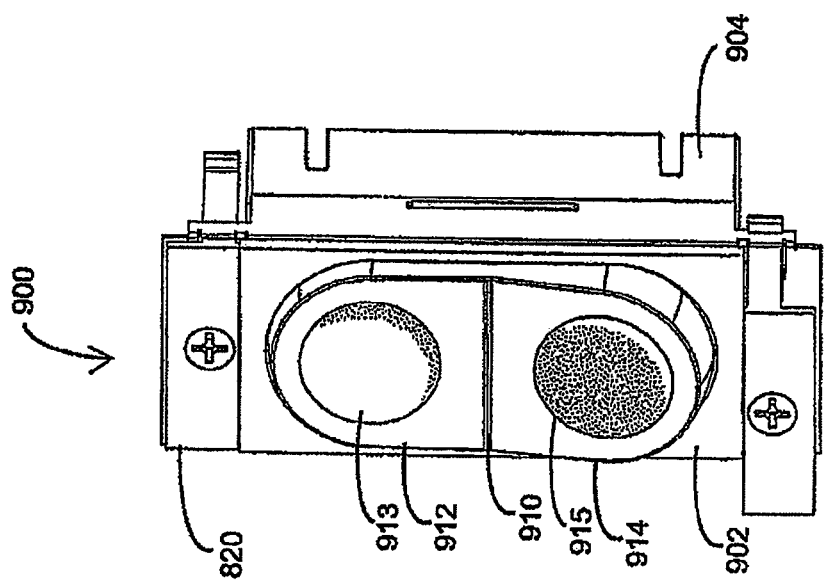
FIGS. 9A-F are perspective views of a switch module.
Figure 9B:
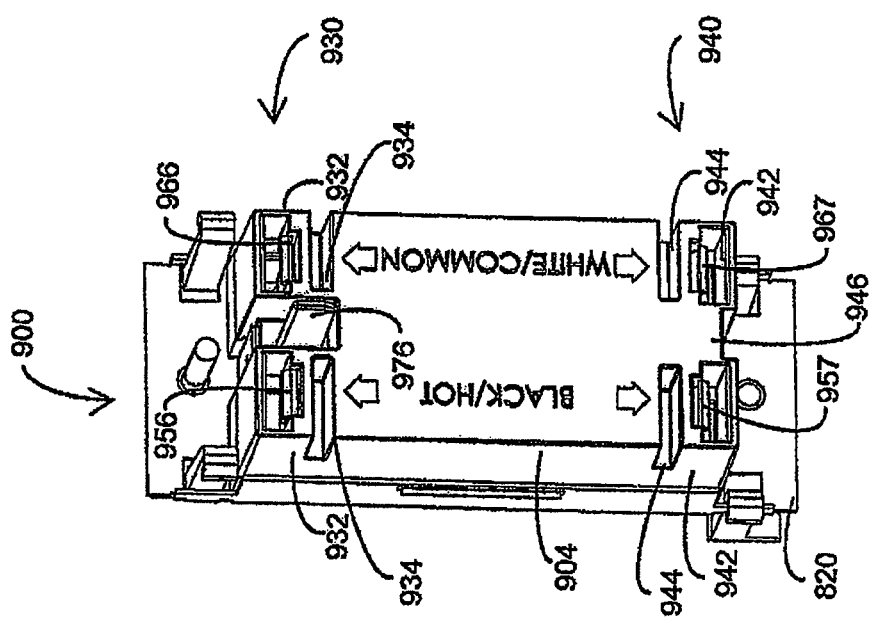

As shown in FIGS. 6A-B, the front face 602 and interior of the electrical box 600 are configured for installment of the wiring panel 700 (FIGS. 7A-B), the protective cover 1100 (FIG. 11A-B), the outlet module 800 (FIGS. 8A-B) and the switch module 900 (FIGS. 9A-B). The interior of the electrical box 600 includes panel mounting posts 610 located along each interior corner edge and module mounting posts 620 located along the center of the interior top and bottom faces. Each of the panel mounting posts 610 is recessed from the front face 602 and has a centered hole 612. In one embodiment, the panel mounting posts 610 are recessed at least about 1.25 inches from the front face 602 to avoid damage to the installed wiring panel 700 (FIGS. 7A-B) during the makeup phase of construction and, in particular, during wall panel installation. Each of the module mounting posts 620 is flush with the front face 602 and has a centered hole 622.

The wiring panel 700 (FIGS. 7A-B) is installed in the interior of the electrical box 600 with panel back side 704 (FIG. 7B) abutting the panel mounting posts 340. The wiring panel 700 (FIGS. 7A-B) is secured within the electrical box 600 with fasteners 707 (FIG. 7C) threaded or otherwise inserted into the centered holes 612, as described with respect to FIG. 14A, below. Similarly, the protective cover 1100 (FIGS. 11A-B) is installed in the interior of the electrical box 600 against the panel mounting posts 340 and secured with fasteners 707 (FIG. 12) inserted through the centered holes 612, as described with respect to FIG. 14B, below. The outlet module 800 (FIGS. 8A-B) and the switch module 900 (FIGS. 9A-B) are snapped into the wiring panel 700 (FIGS. 7A-D) and secured to the module mounting posts 620 with the fasteners 809 (FIGS. 4A-D) threaded or otherwise inserted into centered holes 622, as described with respect to FIGS. 4A-D, above.

Wiring Panel

Figure 7A:
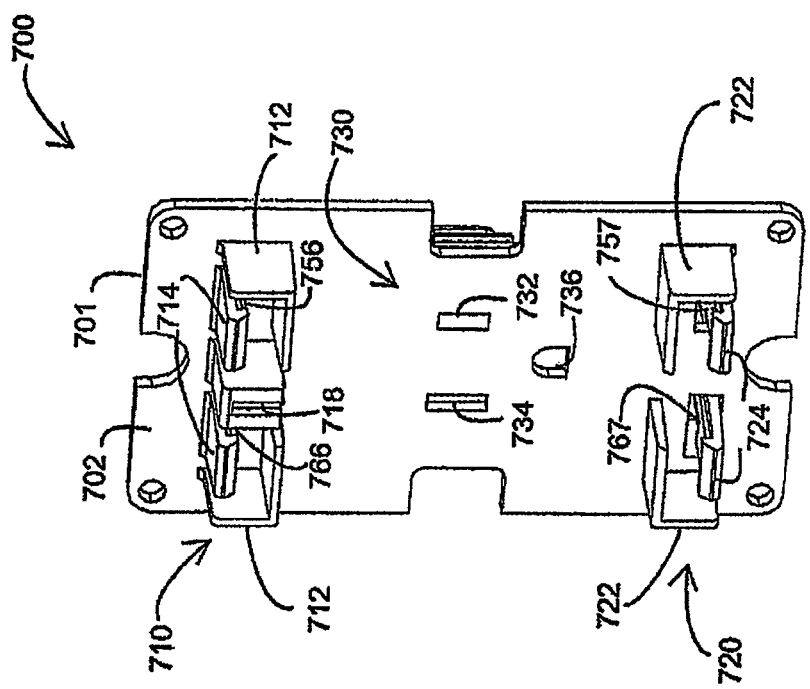
FIGS. 7A-F are perspective views of a wiring panel.
Figure 7B:
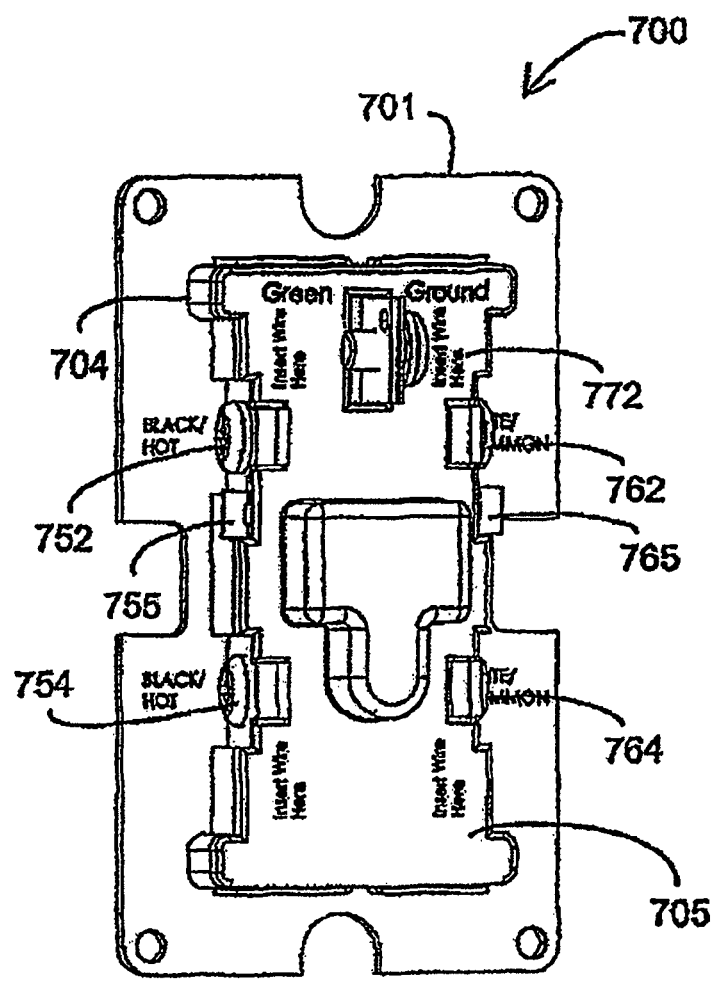

FIGS. 7A-F illustrate the generally planar wiring panel 700, which has a board 701, internal conductors 703, a back cover 705 and fasteners 707. The board 701 (FIG. 7C) retains the internal conductors 703 (FIGS. 7E-F), the back cover 705 (FIG. 7D) and the fasteners 707 (FIG. 7C) of the assembled wiring panel 700 (FIGS. 7A-B). FIGS. 7A-B illustrate the assembled wiring panel 700.

As shown in FIGS. 7A-B, the wiring panel 700 has a front side 702 and a back side 704. As shown in FIG. 7A, the front side 702 has a top panel fixture 710, a bottom panel fixture 720 and an socket 730. The top panel fixture 710 and bottom panel fixture 720 are configured to accept, removably retain and electrically connect to an outlet module 800 (FIGS. 8A-B), a switch module 900 (FIGS. 9A-B) or similar module that provides a user-accessible electrical functions. The top panel fixture 710 has top guides 712, top latches 714, top panel contacts 756, 766 and a ground connector 718, all extending in a direction normal to the front side 702. A ground panel contact 776 (FIG. 7F) is accessible through the ground connector 718. The bottom panel fixture 720 has bottom guides 722, bottom latches 724 and bottom panel contacts 757, 767, also all extending in a direction normal to the front side 702.

Also shown in FIG. 7A, the socket 730 has a hot slot 732, a neutral slot 734 and a ground hole 736. The socket 730 is configured to accept and electrically connect to a standard plug, which is inserted into the socket 730 so that the plug's hot prong, neutral prong and ground post enters the hot slot 732, neutral slot 734 and ground hole 736, respectively, and electrically connects with the hot socket contact 758 (FIGS. 7E-F), neutral socket contact 768 (FIGS. 7E-F) and ground socket contact 778 (FIGS. 7E-F), respectively.

One particularly advantageous feature of the wiring panel 700 is the socket 730. The socket 730 allows power to be supplied to a construction crew after the wiring panel 700 has been wired and building electrical system tested and activated, prior to the makeup phase, as described in further detail with respect to FIGS. 14A-B, below. Another particularly advantageous feature is that a user's exposure to the top panel contacts 756, 766 is minimized by the top guides 712, top latches 714 and ground connector 718 that shield the top panel contacts 756, 766 on all four sides and the front. Further, the ground connector 718 separates the first top panel contact 756 from the second top panel contact 766, reducing the possibility of a short between the top panel contacts 756, 766. Similarly, the bottom guides 722 and bottom latches 724 shield the bottom panel contacts 757, 767 from the sides and the front.

As shown in FIG. 7B, the wiring panel back side 704 has a back cover 705, first buss cable connectors 752, 754, second buss cable connectors 762, 764 and a ground buss cable connector 772. A first buss breakaway 755 can be removed during wiring of the wiring panel 700 in order to isolate the first buss top cable connector 752 from the first buss bottom cable connector 754. Similarly, a second buss breakaway 755 can be removed in order, to isolate the second buss top cable connector 762 from the second buss bottom cable connector 764. During installation of the wiring panel 700 into the electrical box 600 (FIG. 6A-B), described with respect to FIG. 14A, below, one or more electrical cables, such as power or equivalent, are routed through the electrical box apertures 680 and the wires within the cables are attached to the cable connectors 752, 754, 762, 764. The wire connections are made by hooking an uninsulated conductor portion of the wires around the respective screws of the cable connectors 752, 754, 762, 764 and tightening the screws so that the conductors are secured between the screws and their respective busses 750, 760, 770 (FIGS. 7E-F), as is well-known in the art. The particular wiring configuration is a function of a master wiring plan for the building under construction and the module type to be installed in the wiring panel 700. Several wiring panel 700 wiring configurations are described below.

Figure 7C:
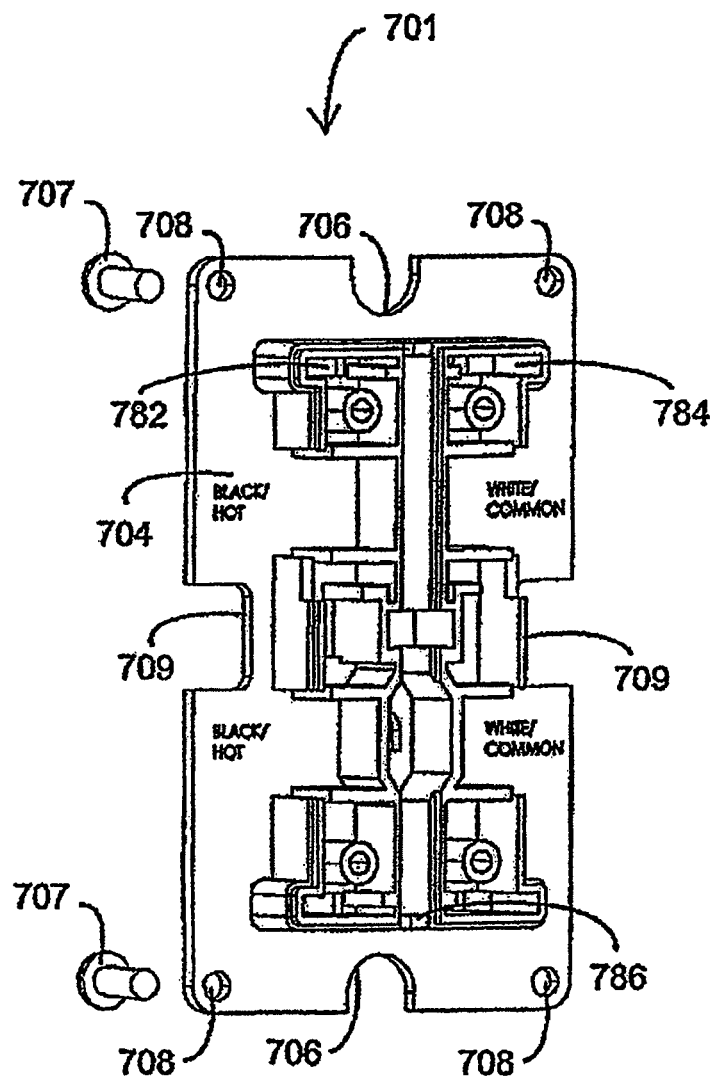

FIG. 7C illustrates the back side 704 of the wiring panel board 701, which has mounting post slots 706, mounting holes 708 and grips 709. These features are used to install the wiring panel 700 and secure it with fasteners 707 within the electrical box 600 (FIGS. 6A-B), as described with respect to FIG. 14A, below. The wiring panel board 701 also has raised chambers 782, 784, 786 that retain the internal conductors 703 (FIGS. 7E-F) and binding sockets 781.

Figure 7D:
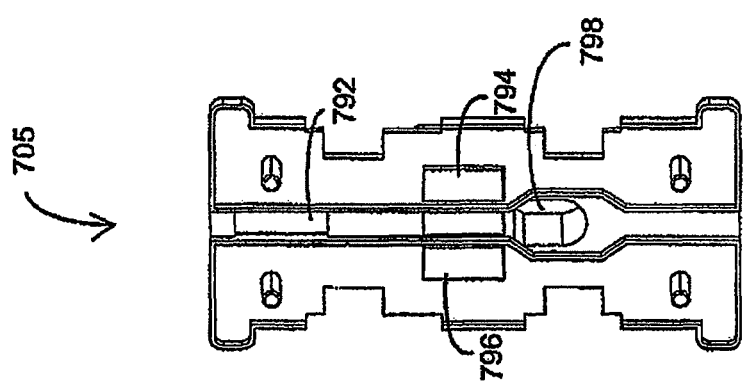

FIG. 7D illustrates the front of the wiring panel back cover 705. The back cover 705 has a connector aperture 792 that accommodates the ground buss cable connector 772 (FIG. 7B), prong apertures 794, 796 that accommodate the prongs of a standard plug inserted into the wiring panel socket 730 (FIG. 7A), and a ground post aperture 798 that accommodates the ground post of the inserted standard plug. Binding posts 791 press-fit into corresponding binding sockets 781 (FIG. 7C) on the panel back side 704 (FIG. 7C) for joining the back cover 705 to the wiring panel board 701 (FIG. 7C).

Figure 7E:
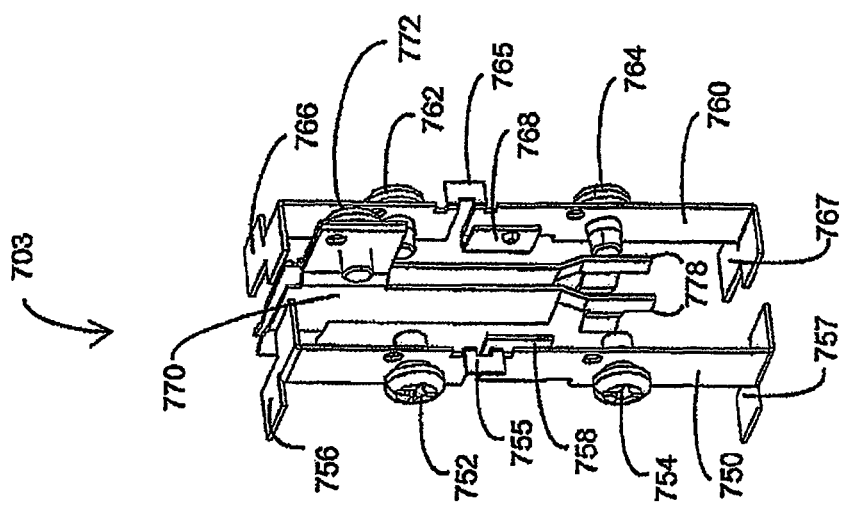
Figure 7F:
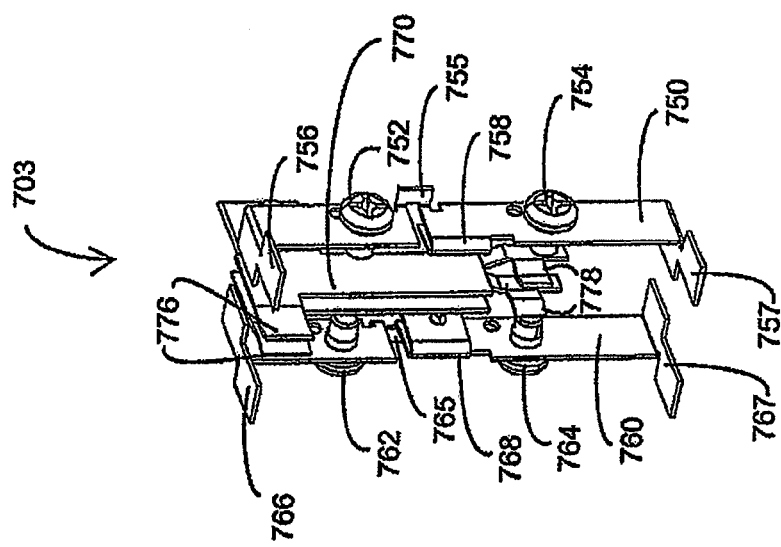

As shown in FIGS. 7E-F, the internal conductors 703 include a first buss 750, a second buss 760 and a ground buss 770. The busses 750, 760, 770 are retained within the wiring panel board raised chambers 782, 784, 786, respectively. The first buss 750 electrically connects the first top panel contact 756, the first buss top cable connector 752, the first buss breakaway 755, the first bottom panel contact 757, the first buss bottom cable connector 754 and the hot socket contact 758. Similarly, the second buss 760 electrically connects the second top panel contact 766, the second buss top cable connector 762, the second buss breakaway 765, the second bottom panel contact 767, the second buss bottom cable connector 764 and the neutral socket contact 768. The ground buss 770 electrically connects the ground panel contact 776, the ground buss cable connector 772 and the socket ground contact 778. If the first buss breakaway 755 is removed, the first top panel contact 756 and the first buss top cable connector 752 are electrically isolated from the first bottom panel contact 757, the first buss bottom cable connector 754 and the hot socket contact 758. Likewise, if the second buss breakaway 765 is removed, the second top panel contact 766 and the second buss top cable connector 762 are electrically isolated from the second bottom panel contact 767, the second buss bottom cable connector 764 and the neutral socket contact 768. The panel contacts 756, 766, 757, 767 provide contact surfaces for electrical connection to outlet module contacts 856, 866, 857, 867 or switch module contacts 956, 966, 957, 967 as described with respect to FIGS. 8F-G and FIGS. 9E-F, below.

Outlet Module

Figure 8C:
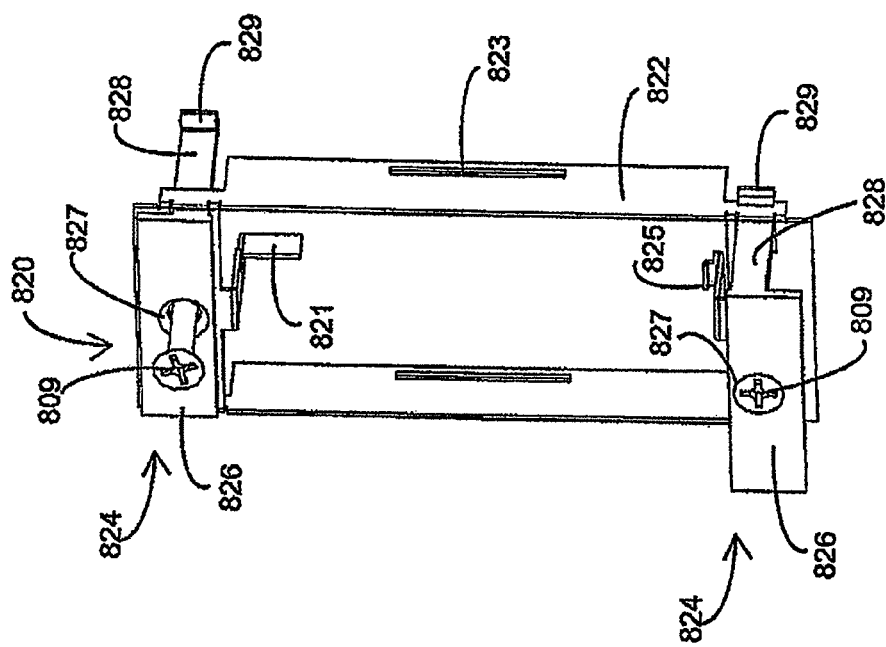
Figure 8D:
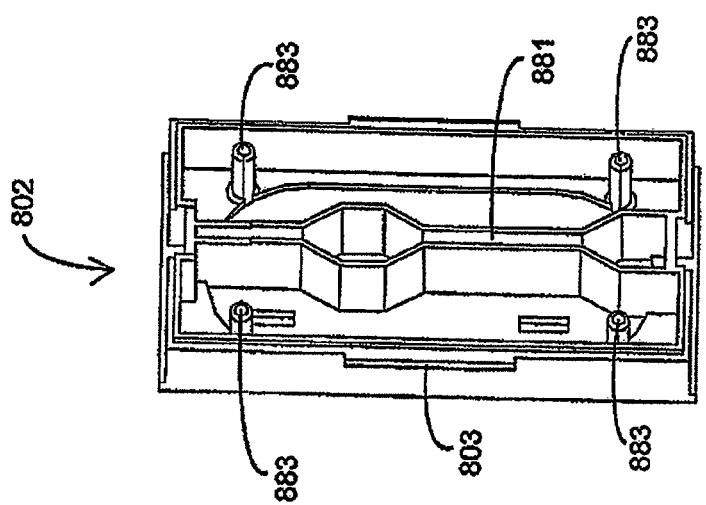
Figure 8E:
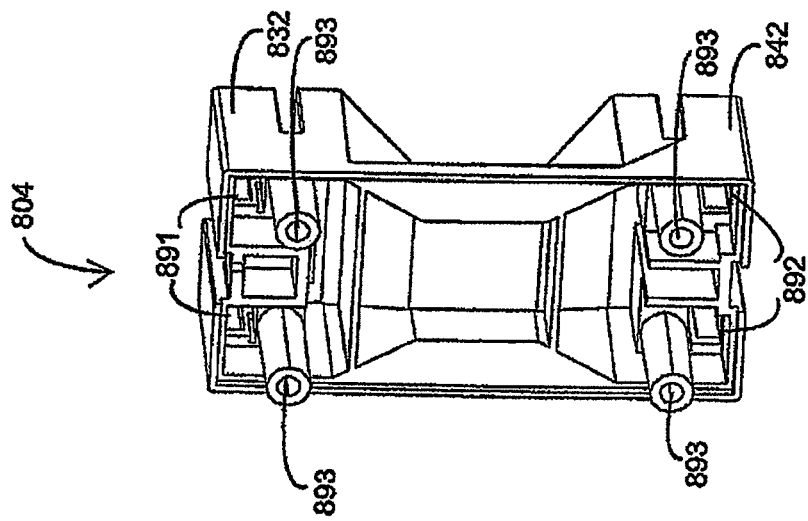
Figure 8F:
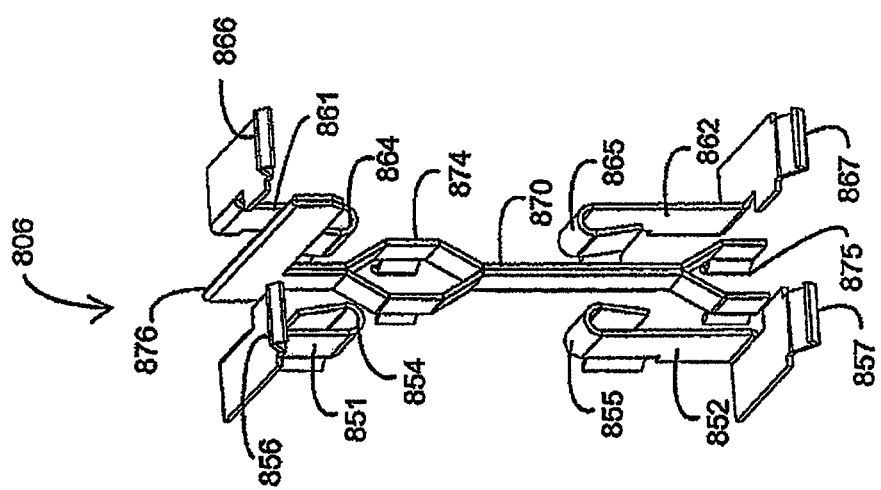
Figure 8G:
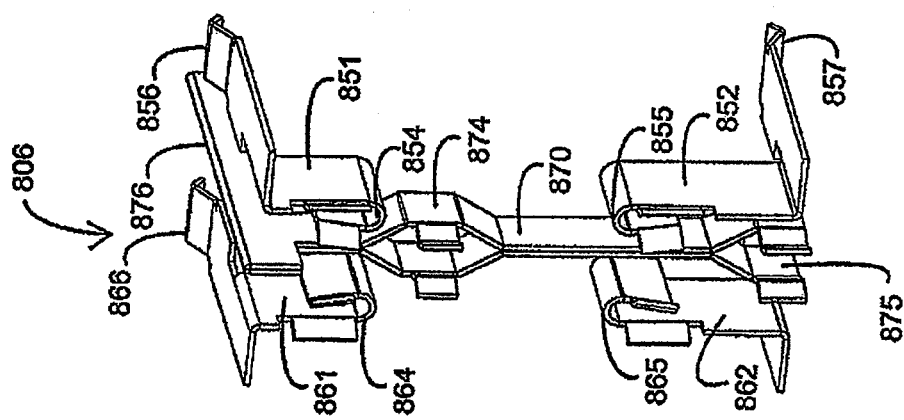

FIGS. 8A-G illustrate an outlet module 800, which has a front cover 802, an attachment assembly 820, a back cover 804 and internal conductors 806. FIGS. 8A-B illustrate an assembled outlet module 800, FIG. 8C illustrates the front of the attachment assembly 820, FIG. 8D illustrates the back of the outlet module front cover 802, FIG. 8E illustrates the front of the outlet module back cover 804, and FIGS. 8F-G illustrate the outlet module internal conductors 806. As shown in FIG. 8A, the front cover 802 and back cover 804 are glued, welded or otherwise attached together to form the body of the outlet module 800. The attachment assembly 820 is retained by the front cover 802, as described with respect to FIG. 8C, below, and provides the means to secure the outlet module 800 to an electrical box 600 (FIGS. 6A-B). The front cover 802 has a raised socket portion 810, which includes a top socket 811 and a bottom socket 816, each compatible with a standard AC plug. The top socket 811 has a hot slot 812, a neutral slot 813 and a ground post hole 814, which provide plug access to the top socket contacts 854, 864, 874 (FIGS. 8F-G). Similarly, the bottom socket 816 has a hot slot 817, a neutral slot 818 and a ground post hole 819, which provide plug access to the bottom socket contacts 855, 865, 875 (FIGS. 8F-G).

As shown in FIG. 8B, the back cover 804 includes a top module fixture 830 and a bottom module fixture 840. The top module fixture 830 includes top contact housings 832 and top slots 834. The bottom module fixture 840 includes bottom contact housings 842, bottom slots 844, and a module key 846. The top contact housings 832 contain top outlet contacts 856, 866, and the bottom contact housings 842 contain bottom outlet contacts 857, 867. A ground bar 876 extends from the back cover 804 between the top contact housings 832.

As shown in FIG. 8C, the attachment assembly 820 includes a bracket 822 and extractor handles 824. The bracket 822 is a one-piece conductive element that fits around the outside of the front cover 802. The sides of the front cover 802 (FIG. 8D) include protruding cover catches 803 (FIG. 8D) that extend through bracket slots 823 to retain the attachment assembly 820 and to retain a cover plate 1000 (FIGS. 10A-D), as described with respect to FIG. 10B, below. The extractor handles 824 are moveably retained by the bracket 822, and each handle 824 has a crossbar 826 and arms 828. At the tip of each handle arm 828 is a clasp 829. In the center of each handle crossbar 826 is a fastener hole 827. A fastener 809, such as a screw or equivalent, is moveably retained within the fastener hole 827. The extractor handles 824 each have a closed position, shown at the top of FIG. 8C, and an open position, shown at the bottom of FIG. 8C. In the closed position, the handles 824 are pushed in so that the crossbar 826 fits against the bracket 822. In the open position, the handles 824 are pulled out so that they extend away from the bracket 822, with the arm clasps 829 each clasping an edge portion of the bracket 822. With the handles 824 in the closed position, the outlet module can be secured to an electrical box 600 (FIGS. 6A-B), as described with respect to FIG. 4A, above. With the handles 824 in the open position, the outlet module can be removed from a wiring panel 700 (FIGS. 7A-B), as described with respect to FIG. 4B, above.

As shown in FIG. 8D, the front cover 802 has binding posts 883 that press-fit into corresponding binding sockets 893 (FIG. 8E) on the back cover 804 (FIG. 8E) for joining the front cover 802 and back cover 804 (FIG. 8E). The front cover 802 also has a raised portion 881 that retains the ground buss 870 (FIGS. 8F-G) and the adjacent top and bottom busses 851, 852, 861, 862 (FIGS. 8F-G).

As shown in FIG. 8E, the back cover 804 has top recessed portions 891 within the top contact housings 832 that retain the top outlet contacts 856, 866 (FIGS. 8F-G). Similarly, the back cover 804 has bottom recessed portions 892 within the bottom contact housings 842 that retain the bottom outlet contacts 857, 867 (FIGS. 8F-G).

As shown in FIGS. 8F-G, the internal conductors 806 of the outlet module 800 include a top hot buss 851, a bottom hot buss 852, a top neutral buss 861, a bottom neutral buss 862, and a ground buss 870. The top hot buss 851 has a top socket hot contact 854 and a top hot module contact 856. The bottom hot buss 852 has a bottom socket hot contact 855 and a bottom hot module contact 857. The top neutral buss 861 has a top socket neutral contact 864 and a top neutral module contact 866. The bottom neutral buss 862 has a bottom socket neutral contact 865 and a bottom neutral module contact 867. The ground buss 870 has a ground bar 876, a top socket ground contact 874 and a bottom socket ground contact 875.

Outlet Module Installation

In reference to FIG. 8B, an outlet module 800 is installed in an electrical box 600 (FIGS. 6A-B) as described with respect to FIGS. 4A-C, E above. An outlet module 800 and the wiring panel 700 (FIGS. 7A-B) are keyed to prevent the installation of an outlet module 800 into a module compartment 400 (FIG. 4C) with an incorrect, i.e. upside-down orientation. Specifically, the module key 846 must engage the bottom panel fixture 720 (FIG. 7A) and the ground bar 876 must engage the ground connector 718 (FIG. 7A) for proper module orientation. The module key 846 will not engage the top panel fixture 710 (FIG. 7A) and the ground bar 876 will not engage the bottom panel fixture 720 (FIG. 7A) in the improper orientation. That is, the module key 846 and ground bar 876 function as keyed structures of the outlet module 800, and the ground connector 718 (FIG. 7A) and bottom panel fixture 720 (FIG. 7A), in particular the gap between the guides and latches 722, 724 (FIG. 7A), function as keyed structures of the wiring panel 700 (FIG. 7A). The keyed structures of the outlet module 800 and the corresponding keyed structures of the wiring panel 700 (FIG. 7A) insure proper orientation of the installed outlet module 800.

In reference to FIGS. 8F-G, when an outlet module 800 (FIGS. 8A-B) is attached to a wiring panel 700 (FIGS. 7A-B), the top hot module contact 856 is electrically connected to the first top panel contact 756 (FIGS. 7E-F), the top neutral module contact 866 is electrically connected to the second top panel contact 766 (FIGS. 7E-F), the bottom hot module contact 857 is electrically connected to the first bottom panel contact 757 (FIGS. 7E-F), and the bottom neutral module contact 867 is electrically connected to the second bottom panel contact 767 (FIGS. 7E-F). In this configuration, if the wiring panel 700 (FIGS. 7A-B) is wired in a full-hot configuration, as described below, then the top 851 and bottom 852 hot busses are hot, the top 861 and bottom 862 neutral busses are neutral and the ground buss 870 is grounded. In this manner, the top socket contacts 854, 864, 874 provide power to a standard AC plug inserted into the top socket 811 (FIG. 8A) and the bottom socket contacts 855, 865, 875 provide power to a standard AC plug inserted into the bottom socket 816 (FIG. 8A). Similarly, if the wiring panel 700 (FIGS. 7A-B) is wired in a half-hot configuration, as described below, then a standard AC plug inserted into (typically) the bottom socket 816 (FIG. 8A) is provided power and a standard plug inserted into (typically) the top socket 811 (FIG. 8A) is provided switched power.

Also in reference to FIGS. 8F-G, the outlet module contacts 856, 857, 866, 867 are spring contacts each extending from busses 851, 852, 861, 862 and each having a generally V-shaped contact point. During installation, as the outlet module 800 (FIGS. 8A-B) is pressed against the wiring panel 700 (FIGS. 7A-B) the top and bottom module contacts 856, 857, 866, 867 press against the corresponding top latches 714 (FIG. 7A) and bottom latches 724 (FIG. 7A). These latches 714, 724 (FIG. 7A) are flexible, spring-like structures extending from the wiring panel board 701 (FIG. 7A) and having a hooked tip. When sufficient pressing force is applied, the spring contacts 856, 857, 866, 867 and the spring latches 714, 724 (FIG. 7A) flex until the contact points pass over and clear the hooked tips and connect with the contact surfaces of the panel contacts 756, 757, 766, 767 (FIG. 7A), with the hooked tip latches 714, 724 retaining the V-shaped module contacts 856, 857, 866, 867. At the instant the contact points pass over the latch tips, the contacts 856, 857, 866, 867 and latches 714, 724 (FIG. 7A) quickly return to their unflexed positions with a mechanical action that is referred to herein as a snap, snapping or snap-in. A similar mechanical action occurs when the contacts 856, 857, 866, 867 and latches 714, 724 (FIG. 7A) are disconnected and is referred to herein as an unsnap, unsnapping or snap-out.

The snapping and unsnapping of the outlet module during installation and removal creates positive tactile feedback that both a mechanical and electrical connection has been made between the outlet module 800 (FIGS. 8A-B) and the wiring panel 700 (FIGS. 7A-B). This is in contrast to a plug-in electrical connection, such as when the prongs of a standard AC plug are inserted into or removed from a standard socket, where the tactile feedback is that of slight, continual resistance to the movement of the plug rather than the build-up and quick release of resistance for the snap-in module installation into the module compartment 400 (FIG. 4C) and attached to the wiring panel 700 (FIGS. 7A-B) or the corresponding snap-out module removal according to the present invention.

Wiring Panel Outlet Module Wiring

In reference to FIG. 7B, the wiring panel 700 is wired for a fall-hot duplex outlet by connecting the black, white and green wires of a single power cable to, for example, the first buss bottom cable connector 754, the second buss bottom cable connector 764, and ground buss cable connector 772, respectively. In this manner, both of the duplex sockets 811, 816 (FIG. 8A) of an installed outlet module 800 (FIGS. 8A-B) are always hot.

Also in reference to FIG. 7B, the wiring panel 700 is wired for a half-hot duplex outlet by connecting the black and white wires of one power cable as described above. The black and white wires of a second power cable are connected to the top hot 752 and neutral 762 connectors, respectively. Break away portions 755, 765 of the hot buss 750 and neutral buss 760, respectively, are removed, isolating the top hot connector 752 from the bottom hot connector 754 and the top neutral connector 762 from the bottom neutral connector 764. This also isolates the top panel contacts 756, 766 (FIG. 7A) from the bottom panel contacts 757, 767 (FIG. 7A). In this manner, one of the duplex sockets 816 (FIG. 8A) of an installed outlet module 800 is always hot and the other duplex socket 811 (FIG. 8A) is on or off, as controlled by a nearby switch that routes power to the second power cable.

Switch Module

Figure 9C:
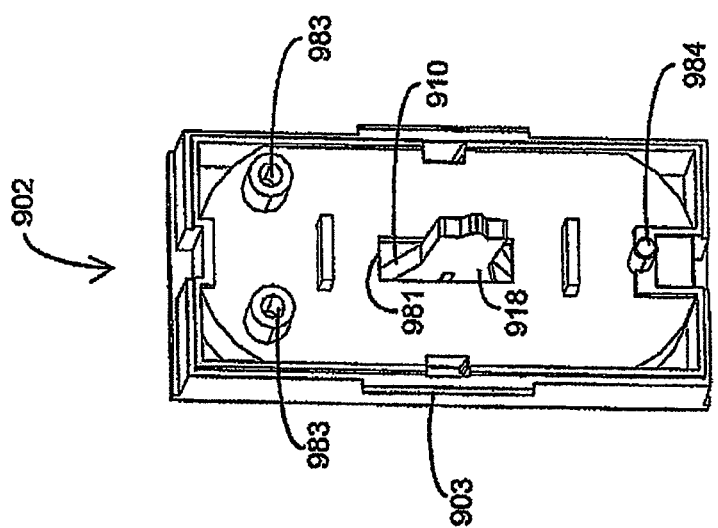
Figure 9D:
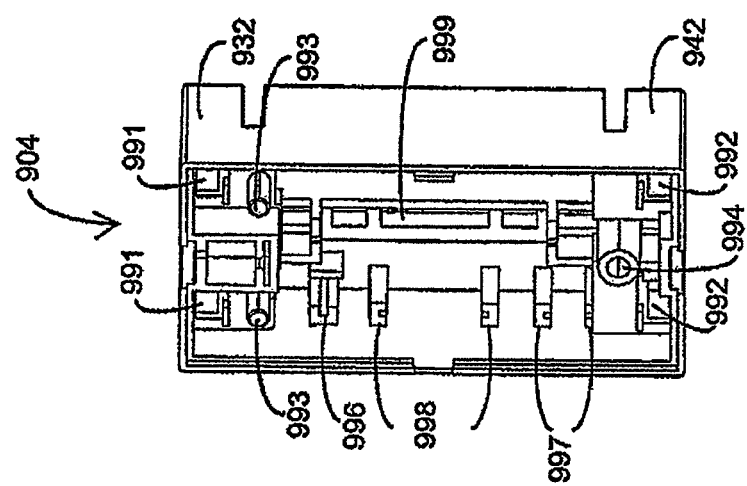
Figure 9E:
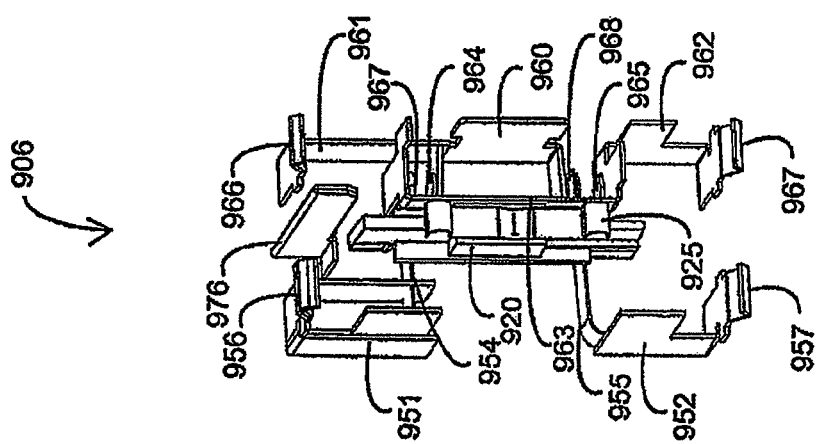
Figure 9F:
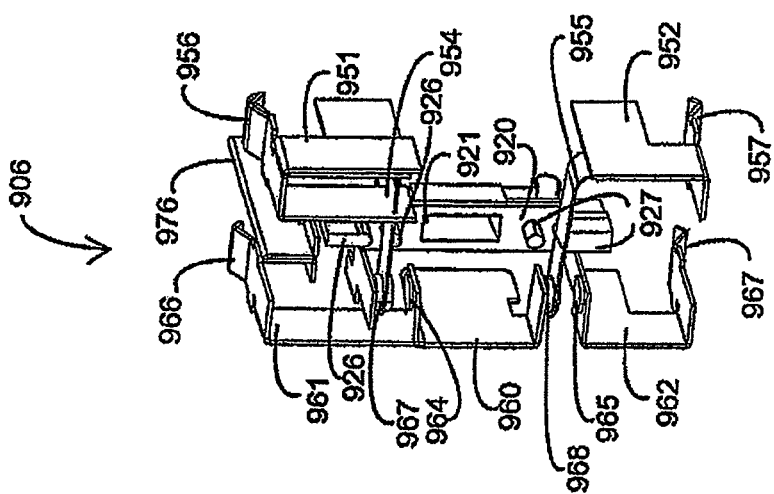

FIGS. 9A-F illustrate a switch module 900, which has a front cover 902, a rocker switch 910, an attachment assembly 820, a back cover 904 and internal conductors 906. FIGS. 9A-B illustrate an assembled switch module 900, FIG. 9C illustrates the back of a switch module front cover 902, FIG. 9D illustrates the front of a switch module back cover 904, and FIGS. 9E-F illustrate the switch module internal conductors 906. As shown in FIG. 9A, the front cover 902 and back cover 904 are glued, welded or otherwise attached together to form the body of the switch module 900. The attachment assembly 820 is retained by the front cover 802, as described with respect to FIG. 8C, above, and provides the means to secure the switch module 900 to an electrical box 600 (FIGS. 6A-B). The front cover 902 incorporates a rocker switch 910, which has an upper portion 912 with a raised button 913 and a lower portion 914 with an indented button 915. The rocker switch 910 has a first position with the upper portion 912 proximate the front cover 902, as shown, and a second position with the lower portion 914 proximate the front cover 902.

As shown in FIG. 9B, the back cover 904 includes a top module fixture 930 and a bottom module fixture 940. The top module fixture 930 includes top contact housings 932 and top slots 934. The bottom module fixture 940 includes bottom contact housings 942, bottom slots 944, and a wiring panel key 946. The top contact housings 932 contain top module contacts 956, 966, and the bottom contact housings 842 contain bottom module contacts 957, 967. A ground bar 976 extends from the back cover 904 between the top contact housings 932.

As shown in FIG. 9C, the front cover 902 has a binding post 984 that press-fits into a corresponding binding socket 994 (FIG. 9D) on the back cover 904 (FIG. 9D) and binding sockets 983 that accept back cover binding posts 993, all for joining the front cover 902 and back cover 904 (FIG. 9D). The front cover 902 also has a switch aperture 981 through which protrudes a lever portion 918 of the rocker switch 910. The sides of the front cover 902 include protruding cover catches 903 that extend through bracket slots 823 (FIG. 8C) to retain the attachment assembly 820 (FIGS. 9A-B) and to retain a cover plate 1000 (FIGS. 10A-D), in a manner similar to that described with respect to FIG. 8C, above.

As shown in FIG. 9D, the back cover 904 has top recessed portions 991 within the top contact housings 932 that retain the top module contacts 956, 966 (FIGS. 9E-F). Similarly, the back cover 904 has bottom recessed portions 992 within the bottom contact housings 942 that retain the bottom module contacts 957, 967 (FIGS. 9E-F). The back cover 904 also has carrier supports 998 for the carrier 960 (FIGS. 9E-F), a buss support 997 for the second bottom buss 962 (FIGS. 9E-F), a support 996 for the top upper throw contact 967 (FIGS. 9E-F), as well as other raised structures (not shown) for supporting the first bottom buss 952 (FIGS. 9E-F) and the first top buss 951 (FIGS. 9E-F). A spring aperture 999 retains the slide spring 925 (FIG. 9E).

As shown in FIGS. 9E-F, the switch module internal conductors 906 include a first top buss 951, a second top buss 961, a first bottom buss 952 and a second bottom buss 962. The first top buss 951 electrically connects the first top module contact 956 and the top pole 954. The first bottom buss 952 electrically connects the first bottom module contact 957 and the bottom pole 955. The second top buss 961 electrically connects the second top module contact 966 and the carrier 960. The carrier 960 has a top lower throw contact 964 and a bottom upper throw contact 968. The second bottom buss 962 electrically connects the second bottom module contact 967 and the bottom lower throw contact 965. A center buss 963 electrically connects the top upper throw contact 967 and the bottom lower throw contact 965.

Also shown in FIGS. 9E-F, a slide 920 has a switch lever aperture 921, top stops 926 and bottom stops 927. The rocker switch lever 918 (FIG. 9C) fits into the lever aperture 921. The spring 925 provides resistance to movement of the slide 920 and a corresponding tactile tension to the rocker switch 910 (FIG. 9A). When the rocker switch 910 (FIG. 9A) is in its first position (as shown in FIG. 9A, the lever 918 (FIG. 9C) is in its down position (as shown in FIG. 9C), which moves the slide 920 in its down position. When the rocker switch 910 (FIG. 9A) is in its second position, the lever 918 (FIG. 9C) is in its up position, which moves the slide 920 to its up position (as shown in FIGS. 9E-F). In the slide upper position, the lower portions of the stops 926, 927 move the poles 954, 955 so as to connect with the upper throw contacts 967, 968. In the slide lower position, the upper portions of the stops 926, 927 move the poles 954, 955 so as to connect with the lower throw contacts 964, 965.

Switch Module Installation

In reference to FIG. 9B, a switch module 900 is installed in an electrical box 600 (FIGS. 6A-B) as described with respect to FIGS. 4D and F, above. A switch module 900 and the wiring panel 700 (FIGS. 7A-B) are keyed to prevent the installation of a switch module 900 into a module compartment 400 (FIG. 4D) with an incorrect, i.e. upside-down orientation. Specifically, the module key 946 must engage the bottom panel fixture 720 (FIG. 7A) and the ground bar 976 must engage the ground connector 718 (FIG. 7A) for proper module orientation. The module key 946 will not engage the top panel fixture 710 (FIG. 7A) and the ground bar 976 will not engage the bottom panel fixture 720 (FIG. 7A) in the improper orientation. That is, the module key 946 and ground bar 976 function as keyed structures of the switch module 900, and the ground connector 718 (FIG. 7A) and bottom panel fixture 720 (FIG. 7A), function as keyed structures of the wiring panel 700 (FIG. 7A), as described with respect to the outlet module 800 (FIGS. 8A-B), above. The keyed structures of the switch module 900 and the corresponding keyed structures of the wiring panel 700 (FIG. 7A) insure proper orientation of the installed switch module 900.

In reference to FIGS. 9E-F, when a switch module 900 (FIGS. 9A-B) is attached to a wiring panel 700 (FIGS. 7A-B), the first top module contact 956 is electrically connected to the first top panel contact 756 (FIGS. 7E-F), the second top module contact 966 is electrically connected to the second top panel contact 766 (FIGS. 7E-F), the first bottom module contact 957 is electrically connected to the first bottom panel contact 757 (FIG. 7E-F), and the second bottom module contact 967 is electrically connected to the second bottom panel contact 767 (FIGS. 7E-F).

Also in reference to FIGS. 9E-F, the switch module contacts 956, 957, 966, 967 are spring contacts and each having a generally V-shaped contact point. During installation, as the switch module 800 (FIGS. 8A-B) is pressed against the wiring panel 700 (FIGS. 7A-B) the top and bottom module contacts 956, 957, 966, 967 press against the corresponding top latches 714 (FIG. 7A) and bottom latches 724 (FIG. 7A) and eventually snap together, in a manner similar to that described with respect to the outlet module 800 (FIGS. 8A-B), above. The snapping and unsnapping of the switch module during installation and removal creates positive tactile feedback that both a mechanical and electrical connection has been made between the switch module 900 (FIGS. 9A-B) and the wiring panel 700 (FIGS. 7A-B) within the module compartment 400 (FIG. 4D).

Switch Module Configurations and Associated Wiring Panel Wiring

SPST Switch

As shown in FIGS. 9E-F, the internal conductors 906 can be configured as a SPST (single-pole, single-throw) switch, a DPST (double-pole, single-throw) switch, a three-way switch, and a four-way switch. If the top upper throw contact 967, the lower throw contact 964 and the bottom upper throw contact 968 are removed, the lower pole 955 and bottom lower throw contact 965 form a SPST switch. When the rocker switch 910 (FIG. 9A) is moved to its first position, causing the slide 920 to move to its lower position, the pole 955 connects with the bottom lower throw contact 965, electrically connecting the first bottom module contact 957 with the second bottom module contact 967. Likewise, when the rocker switch 910 (FIG. 9A) is moved to its second position, causing the slide 920 to move to its upper position, the pole 955 disconnects from the bottom lower throw contact 965, electrically disconnecting the first bottom module contact 957 with the second bottom module contact 967. Thus, movement of the rocker switch 910 (FIG. 9A) between its first and second positions alternately makes and breaks an electrical connection between the bottom module contacts 957, 967.

In reference to FIG. 7B, the wiring panel 700 is wired for a SPST switch, as described above, by connecting the black (hot) wire of a first power cable to the first buss bottom cable connector 754 and the black wire of a second power cable to the second buss bottom cable connector 764. In this manner, when the first bottom module contact 757 is switched to the second bottom module contact 767 via an installed SPST switch module 900 (FIGS. 9A-B), as described with respect to FIGS. 9E-F, above, power is switched between the first and second power cables.

DPST Switch

As shown in FIGS. 9E-F, if the top upper throw contact 967 and the bottom upper throw contact 968 are removed, the upper pole 954 in conjunction with the top lower throw contact 964 and the lower pole 955 in conjunction with the bottom lower throw contact 965 form a DPST switch. When the rocker switch 910 (FIG. 9A) is moved to its first position, causing the slide 920 to move to its lower position, the poles 954, 955 connect with the corresponding lower throw contacts 964, 965 electrically connecting the top module contacts 956, 966 and, also, electrically connecting the bottom module contacts 957, 967. Likewise, when the rocker switch 910 (FIG. 9A) is moved to its second position, causing the slide 920 to move to its upper position, the poles 954, 955 disconnect with the corresponding lower throw contacts 964, 965 electrically disconnecting the top module contacts 956, 966 and, also, electrically disconnecting the bottom module contacts 957, 967. Thus, movement of the rocker switch 910 (FIG. 9A) between its first and second positions alternately makes and breaks an electrical connection between the top module contacts 956, 966 and, also, alternately makes and breaks an electrical connection between the bottom module contacts 957, 967.

In reference to FIG. 7B, the wiring panel 700 is wired for a DPST switch, as described above, by removing the first 755 and second 765 buss breakaways to isolate the top panel contacts 756, 766 (FIGS. 7E-F) from the bottom panel contacts 757, 767 (FIGS. 7E-F) and, hence, isolating the top module contacts 956, 966 (FIGS. 9E-F) from the bottom module contacts 957, 967 (FIGS. 9E-F) of an installed DPST switch module. The black and white wires of a first power cable are connected to the first buss bottom 754 and top 752 cable connectors, respectively. The black and white wires of a second power cable are connected to the second buss bottom 764 and top 762 cable connectors, respectively. In this manner, when the first top panel contact 756 is switched to the second top panel contact 766 and the first bottom panel contact 757 is switched to the second bottom panel contact 767 via an installed DPST switch module 900 (FIGS. 9A-B), as described with respect to FIGS. 9E-F, above, an electrical load can be switched between the first and second power cables.

Three-Way Switch

As shown in FIGS. 9E-F, if the top upper throw contact 967 is removed, the upper pole 954 in conjunction with the top lower throw contact 964 and the lower pole 955 in conjunction with the bottom lower and upper throw contacts 965, 968 form a three-way switch. When the rocker switch 910 (FIG. 9A) is moved to its first position, causing the slide 920 to move to its lower position, the poles 954, 955 connect with the corresponding lower throw contacts 964, 965 electrically connecting the top module contacts 956, 966 and, also, electrically connecting the bottom module contacts 957, 967. When the rocker switch 910 (FIG. 9A) is moved to its second position, causing the slide 920 to move to its upper position, the top pole 954 is disconnected. The bottom pole 955, however, is connected with the bottom upper throw contact 968, which is connected to the second top module contact 966 via the carrier 960 and the second top buss 961. Thus, movement of the rocker switch 910 (FIG. 9A) between its first and second positions alternately makes and breaks an electrical connection between the bottom module contacts 957, 967 and, also, electrically connects the second top module contact 966, alternately, with the first top module contact 956 and the first bottom module contact 957.

Four-Way Switch

As shown in FIGS. 9E-F, if all of the conductors 906 are in place, the upper pole 954 in conjunction with the top lower and upper throw contacts 964, 967 and the lower pole 955 in conjunction with the bottom lower and upper throw contacts 965, 968 form a four-way switch. When the rocker switch 910 (FIG. 9A) is moved to its first position, causing the slide 920 to move to its lower position, the poles 954, 955 connect with the corresponding lower throw contacts 964, 965 electrically connecting the top module contacts 956, 966 and, also, electrically connecting the bottom module contacts 957, 967. When the rocker switch 910 (FIG. 9A) is moved to its second position, causing the slide 920 to move to its upper position, the poles 954, 955 connect with the corresponding upper throw contacts 967, 968, electrically connecting the top first module contact 956 with the bottom second module contact 967 via the center buss 963 and, also, electrically connecting the bottom first module contact 957 with the top second module contact 966 via the carrier 960 and the second top buss 961. Thus, movement of the rocker switch 910 (FIG. 9A) between its first and second positions makes an electrical connection between the bottom module contacts 957, 967 and, also, between the top module contacts 956, 966, and, alternately, makes an electrical connection between the first top module contact 956 and the second bottom module contact 967 and, also, between the first bottom module contact 957 and the second top module contact 966.

The outlet module 800 (FIGS. 8A-B) and switch module 900 (FIGS. 9A-B) are described above as having top and bottom contacts at the back side of the back covers 804 (FIG. 8B), 904 (FIG. 9B), with corresponding contact placement on the wiring panel front side 702 (FIGS. 7A-B). Other contact placements are contemplated as being within the scope of the present invention. For example, one of ordinary skill in the art will recognize that side contacts along the back side of the back covers or contacts along the edges or sides of the module covers also would be feasible. Further, the modules 800 (FIGS. 8A-B), 900 (FIGS. 9A-B) are described above as having spring contacts, with corresponding latches and contact surfaces located on the wiring panel 700 (FIGS. 7A-B). Other contact types and combinations are contemplated as being within the scope of the present invention. For example, contact surfaces and latches mounted in the modules 800 (FIGS. 8A-B), 900 (FIGS. 9A-B), with corresponding spring contacts mounted in the wiring panel 700 (FIGS. 7A-B) are also feasible.

Face Plates

Figure 10A:
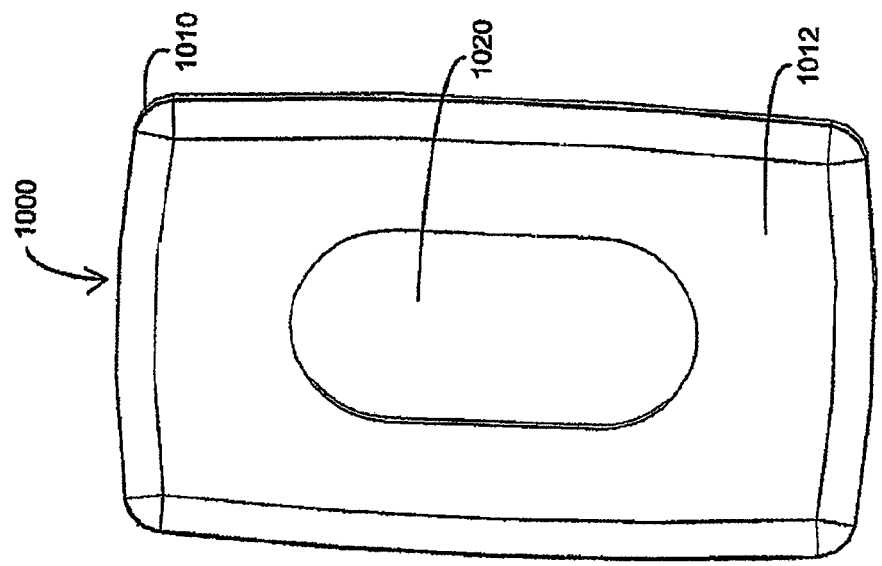
Figure 10B:
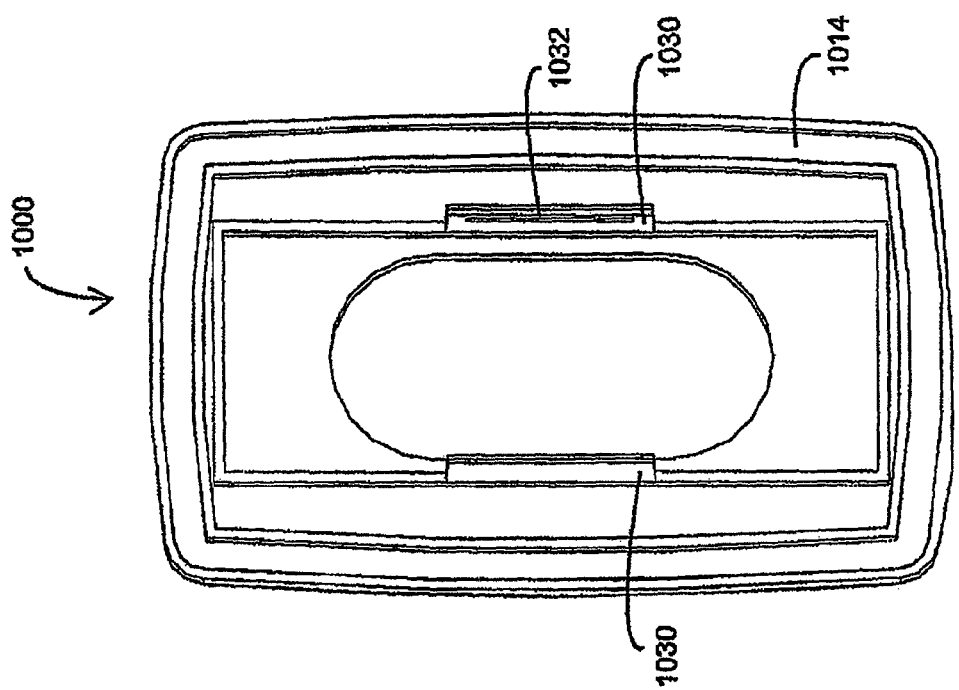
Figure 10C:
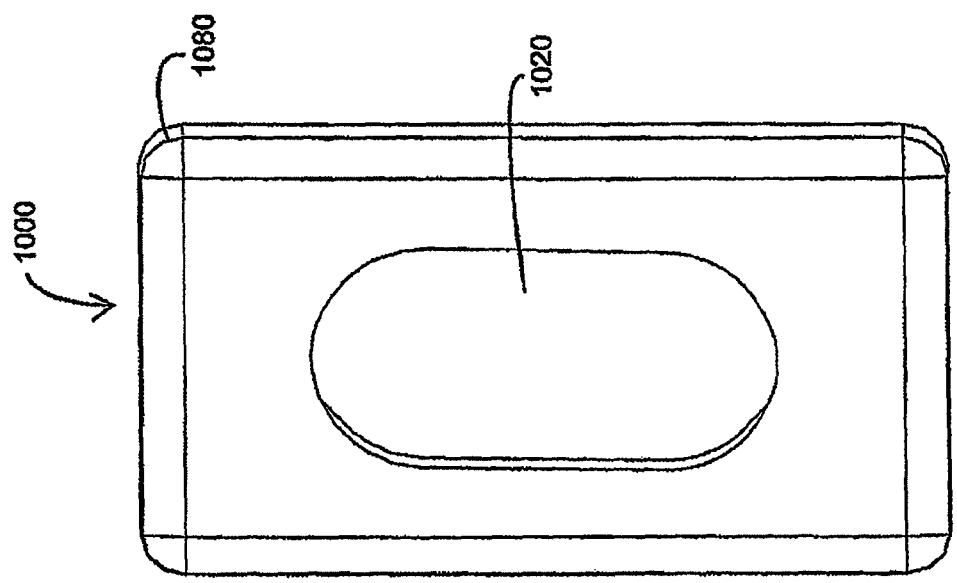

FIGS. 10A-D illustrate a face plate 1000, which provides the wall trim for an installed electrical outlet 310 or switch 360, as described with respect to FIG. 2, above. As shown in FIGS. 10A-B, one embodiment of a face plate 1000 has a flared-rectangular-shaped cover plate 1010 and a cover aperture 1020. In another embodiment, the face plate 1000 has a rectangular-shaped cover plate 1080 (FIG. 10C). In yet another embodiment, the face plate 1000 has an oval-shaped cover plate 1090 (FIG. 10D). The cover plate 1010 has a front side 1012, which is the visible trim when installed, and a back side 1014, which is not visible when installed flush against a wall. The cover aperture 1020 has straight edges and semi-circular ends and fits over the similarly shaped raised portion 810 (FIG. 8A) of an outlet module 800 (FIGS. 8A-B) or the similarly shaped rocker switch 910 (FIG. 9A) of a switch module 900 (FIGS. 9A-B).

As shown in FIG. 10B, the face plate 1000 is installed onto and removed from an installed module 800 (FIGS. 8A-B), 900 (FIGS. 9A-B) without the use of separate fasteners, such as conventional screws. The plate back side 1014 has protruding tabs 1030, each with an indented portion 1032 that latch onto an outlet module catch 803 (FIG. 8D) or switch module catch 903 (FIG. 9C). The tabs 1030 releasably retain the face plate 1000 when pressed onto an installed outlet module 800 (FIGS. 8A-B) or switch module 900 (FIGS. 9A-B). In this manner, the face plate 1000 covers the wall-mounted electrical box 600 (FIGS. 6A-B) and the modules installed therein.

Protective Cover

Figure 11A:
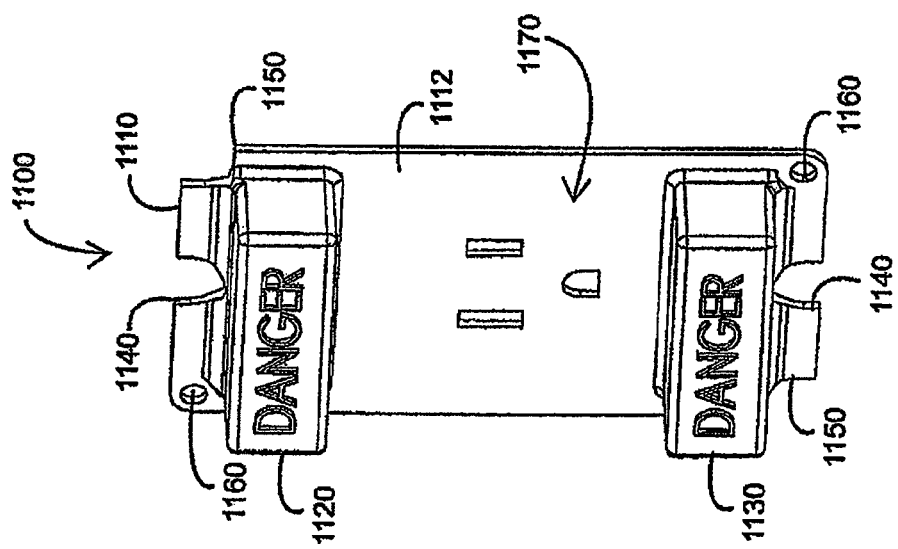
FIGS. 11A-B are front and back perspective views, respectively, of a protective cover.
Figure 11B:
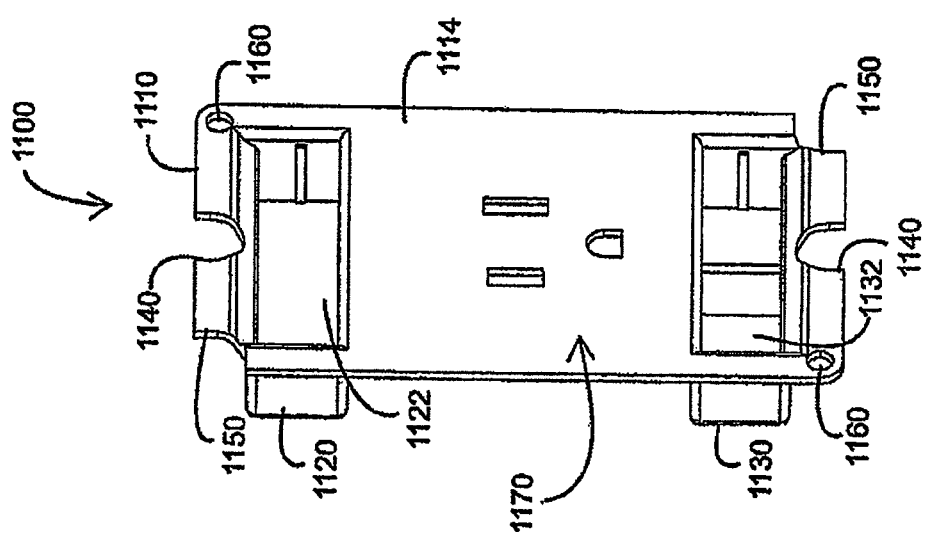

FIGS. 11A-B illustrate a protective cover 1100, which protects the interior of the electrical box 600 (FIGS. 6A-B), the wiring panel 700 (FIGS. 7A-B), and the associated power cables installed within the electrical box 600 (FIGS. 6A-B) during the makeup phase, as described with respect to FIG. 14B, below. The protective cover 1100 has a shield plate 1110, a top sleeve 1120 and a bottom sleeve 1130. The shield plate 1110 is generally planar and dimensioned to closely conform to the interior of the electrical box 600 (FIG. 6A) and the wiring panel front side 702 (FIG. 7A). The top sleeve 1120 extends perpendicularly from the shield plate 1110 so that the top sleeve inside 1122 fits over the top panel fixture 710. The bottom sleeve 1130 also extends perpendicularly from the shield plate 1110 so that the bottom sleeve inside 1132 fits over the bottom panel fixture 720. The shield plate has post slots 1140, cutouts 1150, mounting holes 1160, and a plug opening 1170. The post slots 1140 allow the protective cover 1100 to slide over the module mounting posts 622 (FIG. 6B) during installation in the electrical box 600 (FIGS. 6A-B). The cutouts 1150 and the mounting holes 1160 work in conjunction to allow the protective cover 1100 to be easily secured to and removed from the wiring panel 700 (FIGS. 7A-B) without unfastening the wiring panel 700 (FIGS. 7A-B) from the electrical box 600 (FIGS. 6A-B), as described with respect to FIG. 12, below. The plug opening 1170 allows a standard AC plug to access the wiring panel socket 730 when the protective cover is in place, as described with respect to FIG. 14B, below.

Protective Cover Installation

Figure 12:
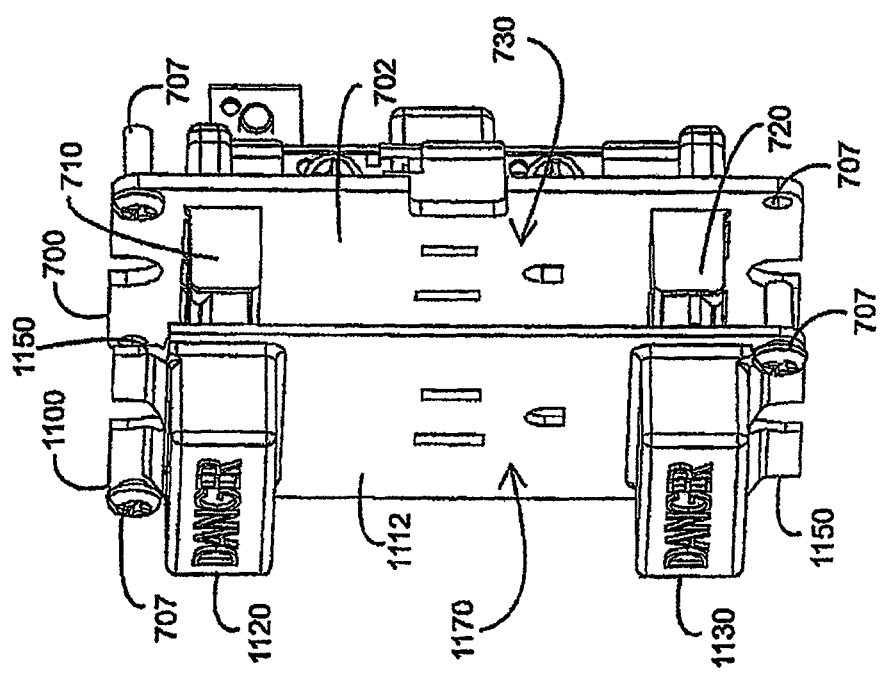
FIG. 12 is a front perspective view of a protective cover and a wiring panel illustrating installation of the protective cover over the wiring panel.

FIG. 12 illustrates a protective cover 1100 during installation over a wiring panel 700. The protective cover 1100 is installed in the interior of the electrical box 600 (FIGS. 6A-B) and positioned so as to shield the exposed front side 702 of the wiring panel 700, as described with respect to FIG. 14B, below. The fasteners 707 corresponding to the mounting holes 1160 are removed from the wiring panel 700. The fasteners 707 corresponding to the cutouts 1150 are not removed during installation or removal of the protective cover 1100, allowing the wiring panel 700 to remain secured inside the electrical box (not shown). As shown in FIG. 12, the protective cover 1100 is positioned within the electrical box (not shown) adjacent the wiring panel 700 so that the protective cover front side 1112 is away from the wiring panel front side 730 and the protective cover plug opening 1170 aligns with the wiring panel socket 730. In this position, the protective cover 1100 is simply pressed against the wiring panel 700 so that the top panel fixture 710 fits within the top sleeve 1120, the bottom panel fixture 720 fits within the bottom sleeve 1130 and the cutouts 1150 fit around the remaining fasteners 707. The protective sleeve 1100 then may be secured to the wiring panel 700 with the removed fasteners 707 threaded through the protective cover mounting holes 1160, the wiring panel mounting holes 708 (FIG. 7C) and the electrical box panel mounting posts 620 (FIGS. 6A-B). Removal of the protective cover 1100 from the wiring panel 700 prior to module installation simply proceeds in the reverse of the above-described steps. The top sleeve 1120 and bottom sleeve 1130 provide a gripping surface for removing the protective sleeve 1100.

Box Mount and Electrical Box Installation

Figure 13A:
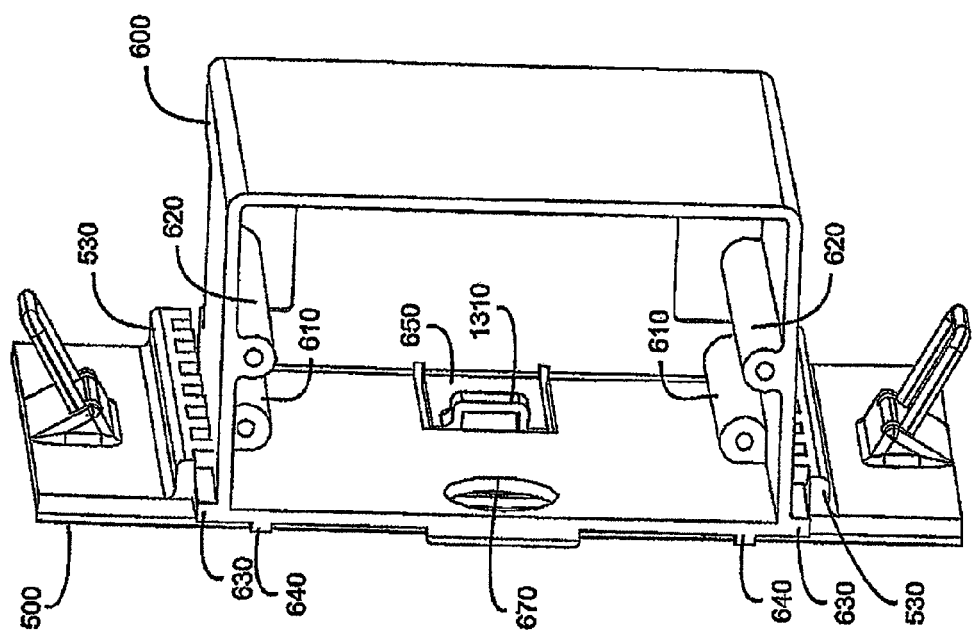
FIGS. 13A-C are front perspective views of a mounted electrical box.
Figure 13B:
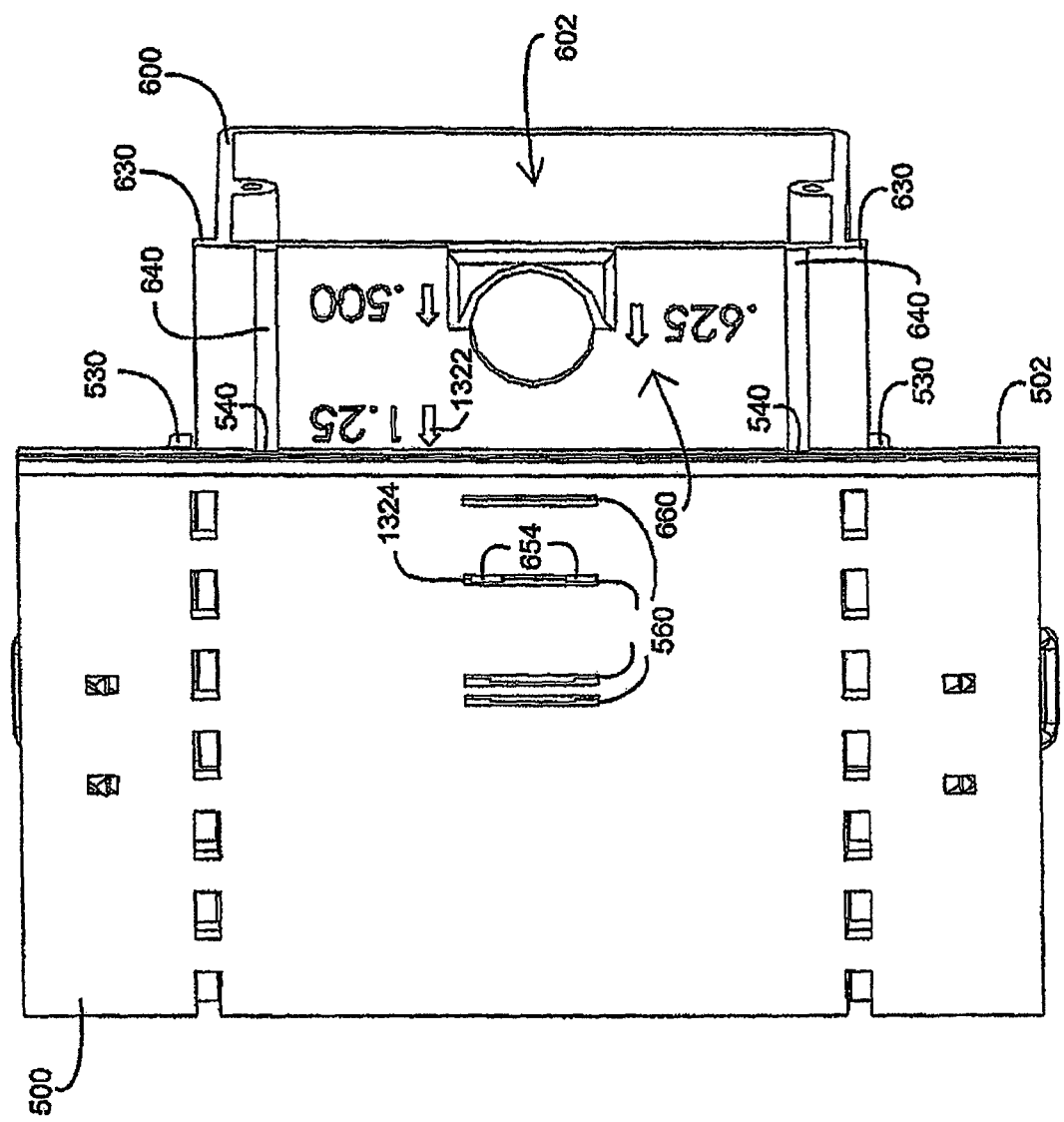
Figure 13C:
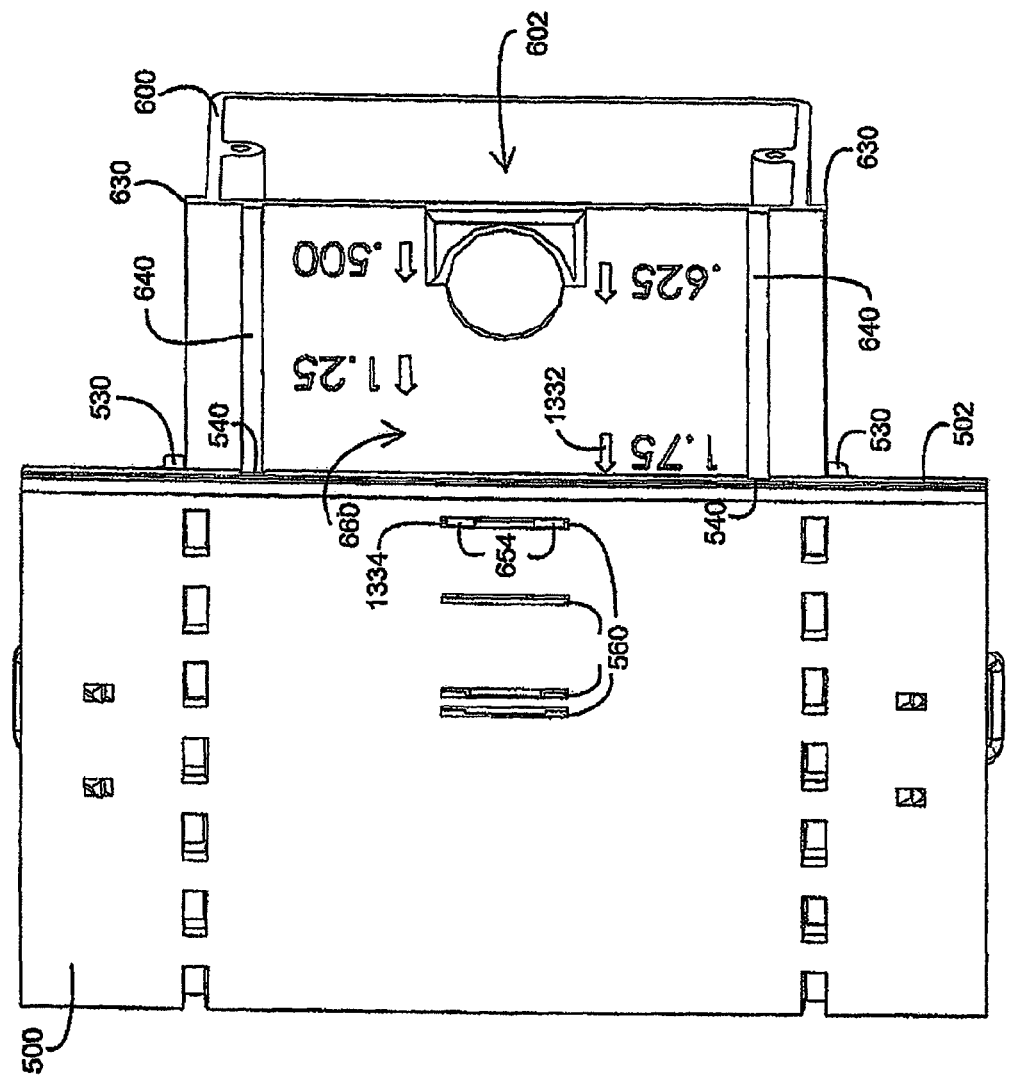

FIGS. 13A-C illustrate an electrical box 600 mounted on a box mount 500. The electrical box 600 is typically mounted after the box mount 500 is installed on a wall stud, as described with respect to FIG. 14A, below. FIG. 13A illustrates the installation of the electrical box 600 on the box mount 700 and illustrates the releasable latch 650 within the electrical box 600 used to lock the electrical box 600 in a fixed position relative to the box mount 500 and, correspondingly, release the electrical box 600 so that it can be moved to another fixed position. FIGS. 13B-C illustrate the various fixed positions of the electrical box 600.

As shown in FIG. 13A, the electrical box 600 is mounted so that the slides 630 are movably retained within the mounting brackets 530 and the guides 640 are moveable within box mount grooves 540 (FIGS. 6A-B). The releasable latch 650 has a tab portion 654 (FIGS. 6A-B) that fits within box mount catch slots 560 (FIGS. 13B-C) to lock the electrical box 600 at various fixed positions. The latch 650 is released and the electrical box 600 moved to different positions by inserting a screwdriver tip or similar tool into a latch release portion 1310. The screwdriver is then twisted so that the screwdriver tip pushes the release portion 1310 away from the electrical box wall, temporarily lifting the tab portion 654 from a catch slot 560 (FIGS. 13B-C). With the latch 650 released, the electrical box 600 can be repositioned along the box mount 500 or removed from the box mount 500 utilizing the finger grip 670 to pull or push the electrical box 600 along the mounting brackets 530.

As shown in FIGS. 13B-C, the electrical box 600 can be releasably locked in any one of several fixed positions. Each of these fixed positions locates the front face 602 a specific distance from the box mount leading edge 502. The box mount 500 is installed on a wall stud, and the leading edge 502 functions as an alignment guide along an edge of the wall stud, as described with respect to FIG. 14A, below. The tab portion 654 of the electrical box latch 650 (FIG. 13A), releasably engages any one of several catch slots 560, which are located at measured positions along the box mount 500. In this manner, the electrical box 600 is positioned so that its open front face 602 is flush with an installed wall panel, advantageously accommodating various wall panel thicknesses. Position indicators 660 align with the leading edge 502 to visibly indicate the distance from the leading edge 502 to the open face 602 associated with the various catch slots 560 and, hence, the various fixed positions of the electrical box 600.

As shown in FIG. 13B, the electrical box 600 is locked in a first position. A particular catch slot 1324 retains the latch tab portion 654, and a corresponding position indicator 1322 aligns with the leading edge 502, visibly indicating 1.25 inches. Thus, the electrical box front face 602 extends from the box mount leading edge 502 and, hence, a wall stud edge, by 1.25 inches.

As shown in FIG. 13C, the electrical box 600 is locked in a second position. A particular catch slot 1334 retains the latch tab portion 654, and a corresponding position indicator 1332 aligns with the leading edge 502, visibly indicating 1.75 inches. Thus, the electrical box front face 602 extends from the box mount leading edge 502 and, hence, a wall stud, by 1.75 inches. In a particular embodiment, the electrical box front face 602 can be extended from the box mount leading edge 502, and hence a wall stud edge, at specific distances in the range of between 0.5 inches and 1.75 inches. In another particular embodiment, the electrical box front-face 602 can be extended from the box mount leading edge 502, and hence a wall stud edge, at specific distances of 0.5, 0.625, 1.25 and 1.75 inches.

The electrical box 600 is described above as having a latch with a tab portion that engages catch slots located along the box mount 500. Other mechanisms for locking the electrical box 600 at various fixed positions relative to the box mount 500 are also contemplated as within the scope of the present invention. For example, the electrical box 600 could have various catch slots, with a latch located on the box mount 500. The catch slots could be any shaped aperture, which is engaged with a correspondingly shaped tab portion of the latch.

The box mount 500 is described above as having a leading edge that functions as an alignment guide. Other features of the box mount could also function as an alignment guide within the scope of the present invention. For example, a feature, such as an arrow or similar indicator could be molded or otherwise attached to the box mount and used as an alignment guide.

Installation at Rough Framing Phase

Figure 14A:
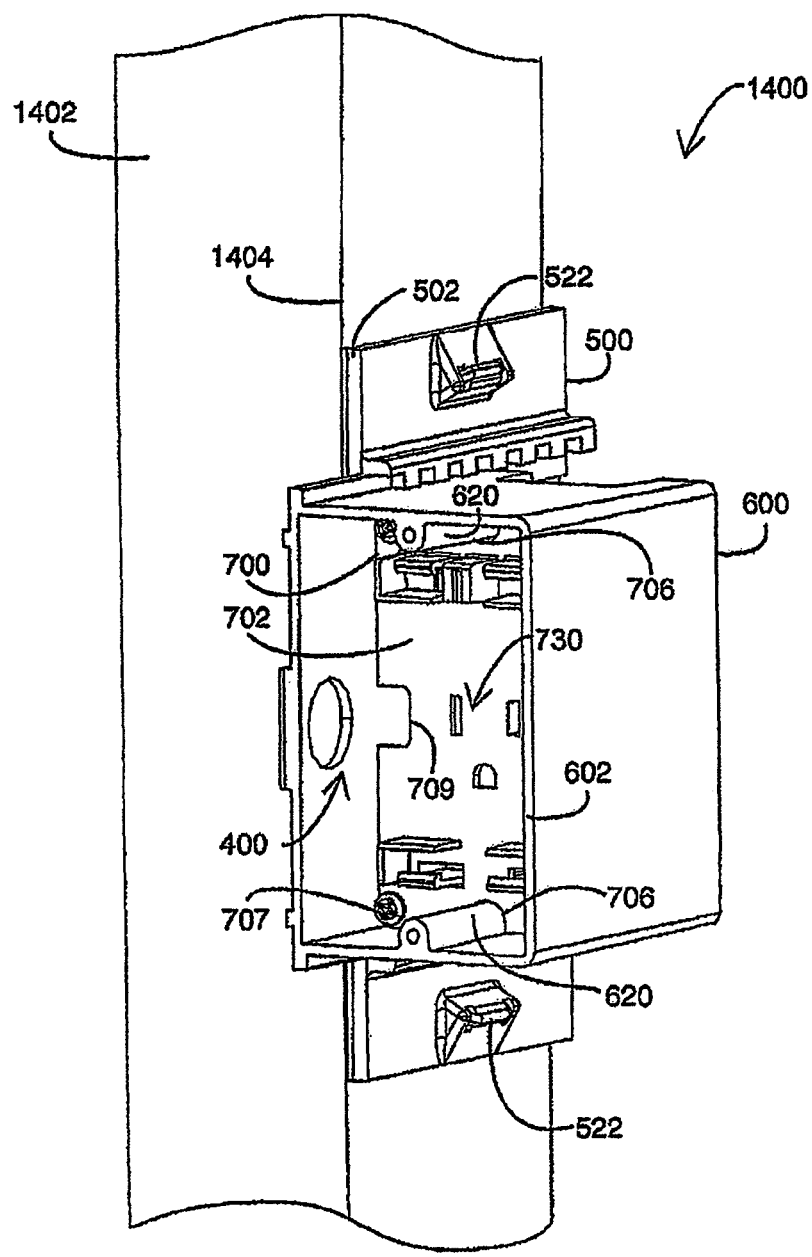
FIGS. 14A-B are front perspective views of a mounted electrical box and associated components installed on a wall stud.
Figure 14B:
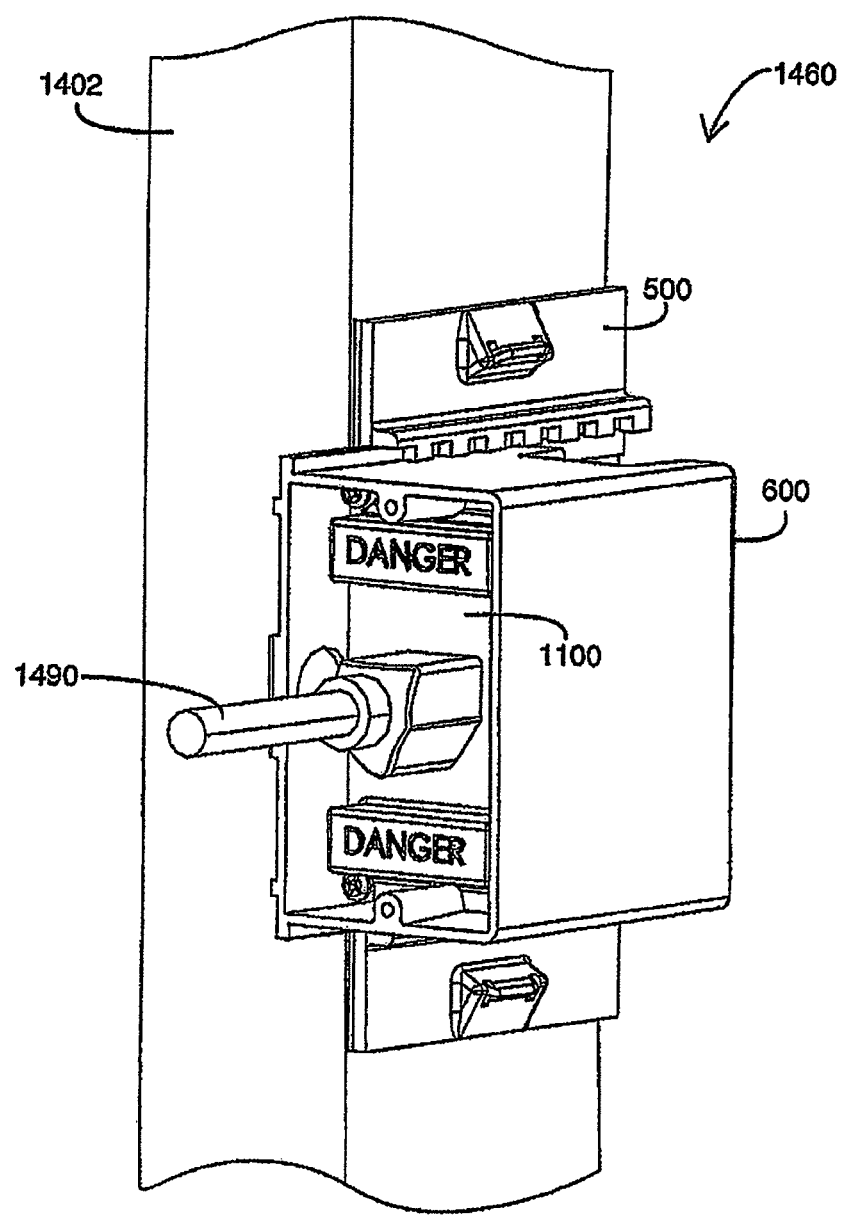

FIGS. 14A-B illustrate a mounted electrical box and associated components installed on a wall stud. FIG. 14A illustrates a partial electrical box assembly 1400 including a box mount 500 attached to a wall stud 1402, a mounted electrical box 600 and an installed wiring panel 700. FIG. 14B illustrates a shielded partial electrical box assembly 1460 including a protective cover 1100 installed over the wiring panel 700 (FIG. 14A) of the partial electrical box assembly 1400 (FIG. 14A).

As shown in FIG. 14A, the box mount 500 is attached to a wall stud 1402 by aligning the box mount leading edge 502 as a guide along the stud's wall-facing edge 1404 and hammering in the fasteners 522, which can be staples, nails or similar devices. The electrical box 600 is then attached to the box mount 500, as described with respect to FIG. 13A, above. This alignment in conjunction with the box mount fixed positions 560 (FIGS. 13B-C) provides a specific distance from the wall stud to the electrical box opening 602, allowing the electrical box to be installed flush with a wall panel finished exterior surface, i.e. the surface typically painted during the makeup phase, as described with respect to FIGS. 13B-C, above.

Also shown in FIG. 14A is an installed wiring panel 700. The wiring panel 700 is installed within the electrical box 600 by positioning the wiring panel 700 at the box open front 602 so that the mounting post slots 706 fit over the mounting posts 620. The wiring panel 700 is then inserted into the electrical box 600 until the wiring panel back side 704 (FIG. 7B) abuts the panel mounting posts 610 (FIGS. 6A-B). The wiring panel 700 is secured within the electrical box 600 against the panel mounting posts 610 (FIGS. 6A-B) by inserting fasteners 707, which are screws or equivalent devices, through the mounting holes 708 (FIGS. 7A-B) and into the panel mounting post centered holes 612 (FIGS. 6A-B). The grips 709 are used to manually grasp and position the wiring panel 700 during installation. One grip 709 also allows access to the electrical box latch 650 (FIG. 13A), for positioning the electrical box after installation of the wiring panel 700.

FIG. 14A shows the partial electrical box assembly 1400 as it would appear in the rough phase or during replacement of a defective module. The wiring panel 700 partitions the electrical box interior into a user accessible module compartment 400 between the front face 602 and the wiring panel front side 702 and a user inaccessible wiring compartment (not visible) between the back face 604 (FIG. 6B) and the wiring panel back side 704 (FIG. 7B). The term user accessibility as used herein is understood to mean access without removal of the wiring panel 700. The module compartment 400 is dimensioned for installation of an outlet module 800 (FIGS. 8A-B), switch module 900 (FIGS. 9A-B) or similar module, such as a dimmer switch. The wiring compartment contains cable connectors for installation of power cables by a journeyman electrician.

As shown in FIG. 14A, the partitioning of the electrical box interior advantageously allows access only to the module compartment 400, which is physically separated from the exposed wiring of the power cables within the wiring compartment (not visible). There is no access to the building electrical wiring without physical removal of the wiring panel 700, preserving the integrity of the electrical wiring from third-party tampering and protecting third-parties from the shock hazard of exposed high voltage conductors. Further, there are no external parts to interfere with wall panel installation, and there are no exposed cables within the module compartment 400 susceptible to fouling or damage during the makeup building phase. Access to the module compartment, however, which has shielded, snap-in contacts, as described with respect to FIG. 7B, above, allows easy and comparatively safe installation or replacement of modules by unskilled personnel.

Prior to module installation, which would typically occur after the makeup phase is complete, a socket 730 is available for accepting a standard AC plug, providing electrical power at the construction site after verification that the wiring panel 700 is properly wired. Punch-outs or other panel markings (not shown) indicate how the panel 700 is wired, such as fall hot, half hot, SPST switch, DPST switch, 3-way switch, 4-way switch as described with respect to FIGS. 15-16, below.

As shown in FIG. 14B, the protective cover 1100 shields the interior of the electrical box 600 and, in particular, the exposed front side of the wiring panel 700 (FIG. 14A). In this manner, the electrical box 600 and wiring panel 700 (FIG. 14A) are advantageously protected from drywall compound, paints and other materials used during wall panel installation. Prior art wiring assemblies, during this makeup phase, have exposed power cables simply coiled up and pushed into bare electrical boxes, exposing the wires to fouling and damage from routers used during wall panel installation, as described above. On the other hand, nothing is exposed to fouling or damage in the partial wiring assembly 1460 of the present invention. After the makeup phase is complete, the shield 1100 can be easily removed, as described with respect to FIG. 12, above. The protective cover 1100 has a plug opening 1170 (FIG. 11) corresponding to the wiring panel socket 730 (FIG. 14A), allowing a standard AC plug 1490 to be inserted through the protective cover 1100 and into the socket 730 (FIG. 14A) for access to electrical power without removal of the protective cover 1100, e.g. during the makeup phase.

Adapter Wiring Panel

Figure 1:
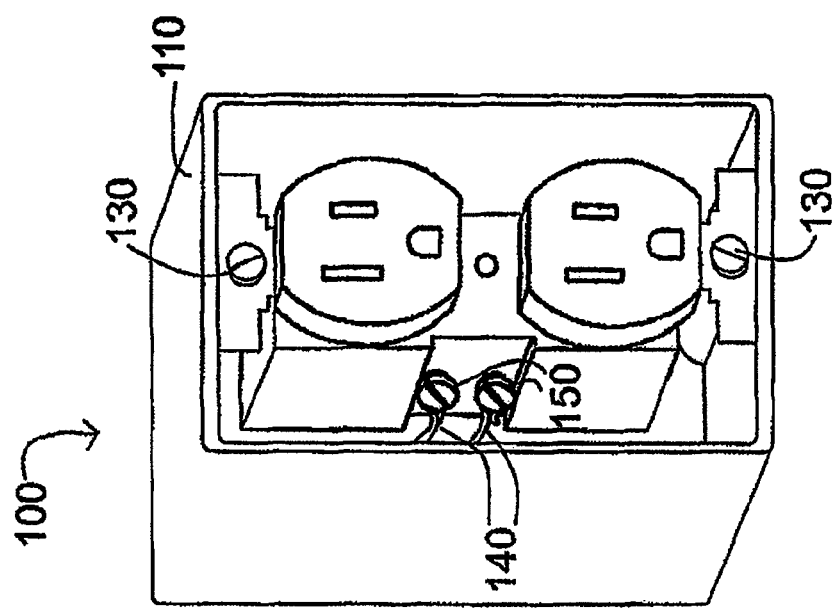
FIG. 1 is a perspective view of a prior art outlet electrical wiring assembly.
Figure 15:
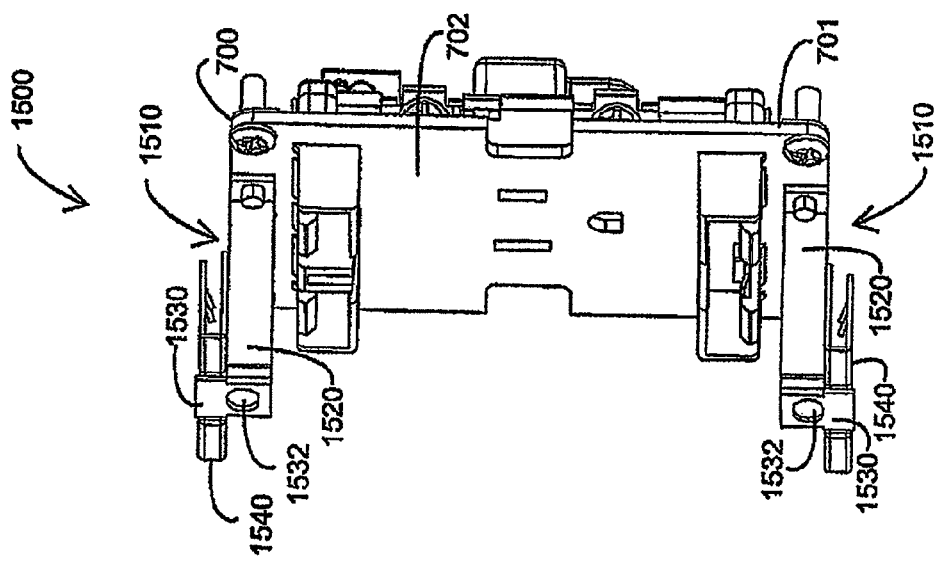
FIG. 15 is a front perspective view of an adapter wiring panel.

FIG. 15 illustrates an adapter wiring panel 1500, which has a wiring panel 700 (FIGS. 7A-B) modified with adapter brackets 1510. The adapter brackets 1510 each have a post 1520, an end piece 1530 and a clip 1540. The post 1520 is fixedly attached to the board 701, extending perpendicularly away from the front face 702. The end piece 1530 is attached to the end of the post 1520 distal the board 701. The clip 1540 is attached to the end piece 1530 perpendicularly to the post 1520. Mounting holes 1532 are provided in each end piece 1530. The adapter wiring panel 1500 is installed within a standard electrical box 100 (FIG. 1) with the clips 1540 attached along the top and bottom box edges and secured with screws 130 (FIG. 1) or equivalent fasteners inserted through the mounting holes 1532 and into the mounting posts at the top and bottom of the electrical box 100 (FIG. 1). In this manner, a standard electrical box 100 (FIG. 1) can be converted to a safety electrical outlet and switch system that accepts snap-in outlet and switch modules according to the present invention. Conveniently, the adapter board can be installed in lieu of a wiring panel 700 (FIGS. 7A-B) in the electrical box 600 (FIGS. 6A-B) utilizing the clips 1540 rather than securing a wiring panel 700 (FIGS. 7A-B) with fasteners 707 (FIG. 7C).

The safety electrical outlet and switch system has been disclosed in detail in connection with various embodiments of the present invention. These embodiments are disclosed by way of examples only and are not to limit the scope of the present invention, which is defined by the claims that follow. One of ordinary skill in the art will appreciate many variations and modifications within the scope of this invention.

What is claimed is:

1. A wiring assembly comprising:
    an electrical box comprising nonconductive material that is configured to attach to a construction framing stud;
    a wiring panel located within the electrical box, the wiring panel comprising:
        a nonconductive housing sized to fit within the electrical box:
        at least a hot bus, neutral bus and ground bus therein;
        a first side comprising a first nonconductive surface and one or more openings that expose a plurality of electrical panel contacts associated therewith;
        a conductive panel key structure associated with one or more of the plurality of electrical contacts;
        a nonconductive panel key structure comprising at least a portion of the nonconductive housing, wherein a portion of the nonconductive panel key structure partially shields the one or more electrical panel contacts of the conductive panel key structure from user contact; and
        a second side comprising a plurality of power wire connection points that interface the hot bus, neutral bus and ground bus with the power cable; and
    a protective cover configured to protect at least a portion of the wiring panel.

2. The wiring assembly of claim 1, further comprising a removable module having an electrical function.

3. The wiring assembly of claim 1, wherein the removable module and the wiring panel latch together.

4. The wiring assembly of claim 3, wherein the nonconductive key structure comprises at least one latch.

5. The wiring assembly of claim 1, wherein the electrical box comprises at least one of the group consisting of: a single wide configuration, a double wide configuration, a triple wide configuration, and quadruple wide configuration.

6. The wiring assembly of claim 1, wherein the nonconductive module key structure is configured to engage the nonconductive panel key structure without the use of tools.

7. The wiring assembly of claim 1, wherein the module electrical contacts are configured to couple with the panel electrical contacts without requiring a user to access exposed portions of wires.

8. A method of constructing a wiring assembly comprising:
    locating a wiring panel within an electrical box, the electrical box comprising nonconductive material that is configured to attach to a construction framing stud, wherein the wiring panel comprises:
        a nonconductive housing sized to fit within the electrical box:
        at least a hot bus, neutral bus and ground bus therein;
        a first side comprising a first nonconductive surface and one or more openings that expose a plurality of electrical panel contacts associated therewith;
        a conductive panel key structure associated with one or more of the plurality of electrical contacts;
        a nonconductive panel key structure comprising at least a portion of the nonconductive housing, wherein a portion of the nonconductive panel key structure partially shields the one or more electrical panel contacts of the conductive panel key structure from user contact; and
        a second side comprising a plurality of power wire connection points that interface the hot bus, neutral bus and ground bus with the power cable; and
    protecting at least a portion of the wiring panel located in the electrical box with a protective cover.

9. The method assembly of claim 8, further comprising a removable module having an electrical function.

10. The method of claim 8, wherein the removable module and the wiring panel latch together.

11. The method of claim 8, wherein the nonconductive key structure comprises at least one latch.

12. The method of claim 8, wherein the electrical box comprises at least one of the group consisting of: a single wide configuration, a double wide configuration, a triple wide configuration, and quadruple wide configuration.

13. The method of claim 8, wherein the nonconductive module key structure is configured to engage the nonconductive panel key structure without the use of tools.

14. The method of claim 8, wherein the module electrical contacts are configured to couple with the panel electrical contacts without requiring a user to access exposed portions of wires.

* * * * *